US009555715B2

(12) United States Patent
Sugano

(10) Patent No.: US 9,555,715 B2
(45) Date of Patent: Jan. 31, 2017

(54) RAPID CHARGING POWER SUPPLY SYSTEM

(71) Applicant: Institute for Energy Application Technologies Co., Ltd., Kanagawa (JP)

(72) Inventor: Tomio Sugano, Tochigi (JP)

(73) Assignee: Institute for Energy Application Technologies Co., Ltd., Kanagawa (JP)

(*) Notice: Subject to any disclaimer, the term of this patent is extended or adjusted under 35 U.S.C. 154(b) by 313 days.

(21) Appl. No.: 14/363,734

(22) PCT Filed: Dec. 6, 2012

(86) PCT No.: PCT/JP2012/081675
§ 371 (c)(1),
(2) Date: Jun. 6, 2014

(87) PCT Pub. No.: WO2013/084999
PCT Pub. Date: Jun. 13, 2013

(65) Prior Publication Data
US 2014/0347017 A1 Nov. 27, 2014

(30) Foreign Application Priority Data
Dec. 8, 2011 (JP) .................. 2011-268911

(51) Int. Cl.
*B60L 11/18* (2006.01)
*H01M 10/44* (2006.01)
(Continued)

(52) U.S. Cl.
CPC ............ *B60L 11/1816* (2013.01); *B60L 1/003* (2013.01); *B60L 11/005* (2013.01); *B60L 11/182* (2013.01);
(Continued)

(58) Field of Classification Search
CPC . H02J 7/0027; B60L 11/1809; B60L 11/1824; B60L 11/1825; B60L 11/1816; B60L 11/185; Y02T 90/121
See application file for complete search history.

(56) References Cited

U.S. PATENT DOCUMENTS 5,498,951 A * 3/1996 Okamura ................ H02J 7/345
320/166
5,548,200 A * 8/1996 Nor ........................ B60L 11/184
320/106
(Continued)

FOREIGN PATENT DOCUMENTS

CN 101617454 12/2009
CN 101657336 2/2010
(Continued)

OTHER PUBLICATIONS

International Search Report dated Feb. 19, 2013, from International Patent Application No. PCT/JP2012/081675, 4 pp.
(Continued)

*Primary Examiner* — Naum B Levin
(74) *Attorney, Agent, or Firm* — Klarquist Sparkman, LLP

(57) ABSTRACT

Example embodiments of rapid charging power supply systems are disclosed herein. One example rapid charging power supply system comprises: a stationary rapid charger (11); a power supply switch (11m) for switching and supplying DC power from the stationary rapid charger (11) to either a first charging circuit (20A) for supplying the DC power to a first electric moving vehicle (50) or a second charging circuit (20B) for supplying the DC power to a second electric moving body (53); a stationary electric storage unit (15) capable of storing DC power from the first charging circuit (20A) and used for being directly supplied to at least the first electric moving body (50); and a power
(Continued)

feeding controller (12) for stopping power supply to the stationary electric storage unit (15) when charging an on-vehicle electric storage unit (85) of the first electric moving body (50).

6 Claims, 17 Drawing Sheets

(51) Int. Cl.
    *H02J 7/02*          (2016.01)
    *B60L 1/00*          (2006.01)
    *B60L 11/00*        (2006.01)
    *H02J 7/00*          (2006.01)

(52) U.S. Cl.
    CPC ............ *B60L 11/184* (2013.01); *B60L 11/185* (2013.01); *B60L 11/1805* (2013.01); *B60L 11/1811* (2013.01); *B60L 11/1818* (2013.01); *B60L 11/1824* (2013.01); *B60L 11/1825* (2013.01); *B60L 11/1833* (2013.01); *B60L 11/1842* (2013.01); *B60L 11/1844* (2013.01); *B60L 11/1846* (2013.01); *B60L 11/1866* (2013.01); *H01M 10/44* (2013.01); *H02J 7/0027* (2013.01); *H02J 7/02* (2013.01); *B60L 2200/26* (2013.01); *B60L 2210/10* (2013.01); *B60L 2210/30* (2013.01); *B60L 2210/40* (2013.01); *B60L 2230/16* (2013.01); *B60L 2240/34* (2013.01); *H02J 7/0054* (2013.01); *H02J 2007/0095* (2013.01); *Y02E 60/721* (2013.01); *Y02T 10/7005* (2013.01); *Y02T 10/7022* (2013.01); *Y02T 10/7055* (2013.01); *Y02T 10/7061* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 7,301,308 B2 * | 11/2007 | Aker | H02J 7/0042 320/139 |
| 8,174,235 B2 * | 5/2012 | Dyer | B60L 11/1809 180/65.21 |
| 8,183,819 B2 | 5/2012 | Sugano | |
| 8,427,103 B2 * | 4/2013 | Ohtomo | B60K 6/28 320/109 |
| 9,082,112 B2 * | 7/2015 | Sullivan | G06Q 20/105 |
| 9,123,035 B2 * | 9/2015 | Penilla | G06Q 20/18 |
| 9,168,841 B2 | 10/2015 | Kawai et al. | |
| 2006/0071631 A1 | 4/2006 | Cheung et al. | |
| 2007/0279011 A1 * | 12/2007 | Jones | H01G 9/14 320/167 |
| 2010/0072946 A1 | 3/2010 | Sugano | |
| 2011/0204720 A1 | 8/2011 | Ruiz et al. | |
| 2011/0291616 A1 | 12/2011 | Kim et al. | |
| 2011/0304304 A1 | 12/2011 | Ankyu | |
| 2012/0200259 A1 * | 8/2012 | Sullivan | G06Q 20/105 320/109 |
| 2013/0049676 A1 * | 2/2013 | Ishikawa | B60L 11/185 320/103 |
| 2016/0121735 A1 * | 5/2016 | Sugano | B60L 11/1818 320/109 |

FOREIGN PATENT DOCUMENTS

| | | |
|---|---|---|
| CN | 101917046 | 12/2010 |
| CN | 102255350 | 11/2011 |
| CN | 102280918 | 12/2011 |
| CN | 102470776 | 5/2012 |
| EP | 2399772 | 12/2011 |
| JP | 7-503837 | 4/1995 |
| JP | 11-027807 | 1/1999 |
| JP | 11-503599 | 3/1999 |
| JP | 2007-336778 | 12/2007 |
| WO | WO 93/08630 | 4/1993 |
| WO | WO 96/32768 | 10/1996 |
| WO | WO 2008/102543 | 8/2008 |
| WO | WO 2010/082506 | 7/2010 |
| WO | WO 2012/134495 | 10/2012 |

OTHER PUBLICATIONS

First Office Action and Search Report dated Dec. 2, 2015, from Chinese Patent Application No. 201280069354.0, 8 pp.

\* cited by examiner

RAPID CHARGING POWER SUPPLY SYSTEM

TECHNICAL FIELD

The present invention is directed to a rapid charging power supply system capable of rapidly charging an electric moving body, such as a vehicle and a ship, and in particular, the present invention is directed to a rapid charging power supply system capable of rapidly charging each of two electric moving bodies of different charging methods.

BACKGROUND ART

While electric vehicles are excellent from an environmental point of view since they do not release exhaust gas, they have a problem of requiring a relatively long period of time for charging. In order to shorten the charging time, it is necessary to supply a large amount of electric power in a short period of time to electric vehicles; and it is necessary for an area in which only low voltage power lines are laid to increase the power reception capacity of the electric power facilities. Accordingly, there is a technique known to rectify commercial AC power, to store DC power in a large-size storage battery, and to rapidly charge a plurality of electric vehicles of different charging conditions at the same time using the stored DC power (see, for example, Patent Literature 1). The electric vehicle according to Patent Literature 1 is equipped with a rapid-charging control means suitable for an on-vehicle storage battery, and integrated designing is allowed for an on-vehicle storage battery and a rapid-charging control means.

Various types of methods are currently proposed for a method for rapidly charging an electric vehicle. As one of the methods, there is a method for performing charge control suitable for a storage battery equipped in an electric vehicle using a stationary rapid charger, which is provided outdoor or the like to supply the charging controlled power to the electric vehicle (see, for example, Patent Literature 2).

CITATION LIST

Patent Literature

[Patent Literature 1]: Japanese Patent No. 4731607
[Patent Literature 2]: Japanese Laid-Open Publication No. 2007-336778.

SUMMARY OF INVENTION

Solution to Problem

However, the electric vehicle corresponding to the charging method according to Patent Literature 2 is not equipped with a rapid-charging control means. Thus, according to this method, one stationary rapid charger can only rapidly charge one vehicle, thus causing a problem of creating a long waiting time for charging. In addition, since electric vehicles are not currently fully widespread, the stationary rapid charger according to Patent Literature 2 is not frequently used, causing a problem of low operation rates. Accordingly, if the stationary rapid charger is used, not only simply for electric vehicles without a rapid-charging control means, but also for the rapid charging of electric vehicles of the type equipped with a rapid-charging control means, as in Patent Literature 1, then efficient use of the stationary rapid charger can be promoted, which is extremely beneficial.

Today, motorization is rapidly promoted for vehicles, ships and other moving bodies from the viewpoint of improving the global environment, and the development of a rapid charging power supply system is required, in which a single system is applicable for different charging methods.

Accordingly, an objective of the present invention is to provide a rapid charging power supply system capable of rapidly charging both of an electric moving body equipped with a rapid-charging control means and an electric moving body without a rapid-charging control means, using a single stationary rapid charger.

Solution to Problem

In order to achieve the objective described above, the invention defined by claim 1 is a rapid charging power supply system capable of supplying electric power for rapid charging to each of a first electric moving body equipped with a rapid-charging control means, and a second electric moving body which is not equipped with the rapid-charging control means, the rapid charging power supply system comprising: a stationary rapid charger for controlling electric power supplied from a power source to be DC power having a voltage and a current optimum for rapid charging of an on-vehicle electric storage means equipped in the second electric moving body; a power supply switching means for supplying the DC power from the stationary rapid charger through switching of either a first charging circuit for supplying the DC power to the first electric moving body or a second charging circuit for supplying the DC power to the second electric moving body; a stationary electric storage means connectable with the stationary rapid charger side through the power supply switching means, the stationary electric storage means being charged with the DC power supplied from the stationary rapid charger to the first charging circuit side through the power supply switching means, and being capable of at least storing the DC power to be directly sent to the first electric moving body, except for during the charging of the on-vehicle electric storage means of the second electric moving body; and a power feeding control means provided between the power supply switching means and the stationary electric storage means, for discontinuing power feeding from the stationary rapid charger to the stationary electric storage means during charging of an on-vehicle electric storage means of the first electric moving body with the DC power output from the stationary electric storage means.

According to the invention, electric power stored in the stationary electric storage means is directly sent to the first electric moving body equipped with the rapid-charging control means; the voltage and the current necessary for rapid charging are optimally controlled by the rapid-charging control means equipped in the first electric moving body; and the rapid charging is performed on the electric storage means of the first electric moving body. On the other hand, electric power in which a voltage and a current are optimally controlled is supplied from the stationary rapid charger to the second electric moving body which is not equipped with the rapid-charging control means; and the rapid charging is performed on the electric storage means of the second electric moving body with the controlled electric power.

The invention defined by claim 2 is such that, in the rapid charging power supply system according to claim 1, a part of the electric power stored in the stationary electric storage means is usable for rapid charging of the on-vehicle electric storage means of the second electric moving body through the stationary rapid charger.

The invention defined by claim 3 is such that, in the rapid charging power supply system according to claim 1, the stationary electric storage means is connected with an inverter for converting DC power to AC power and supplying the converted AC power to a commercial electric power system.

The invention defined by claim 4 is such that, in the rapid charging power supply system according to claim 1, the stationary rapid charger is capable of supplying DC power in which neither a voltage nor a current is controlled for rapid charging, to the first electric moving body connected to the first charging circuit.

The invention defined by claim 5 is such that, in the rapid charging power supply system according to claim 1, the first electric moving body has a power converter for converting AC power from a commercial AC power supply or a non-contact power feeding means connected to the stationary electric storage means side into DC power, and the rapid-charging control means is connected with an output side of the power converter.

The invention defined by claim 6 is such that, in the rapid charging power supply system according to claim 1, the electric power input to the stationary rapid charger is electric power generated by utilizing renewable energy.

Advantageous Effects of Invention

According to the invention defined by claim 1, the rapid charging power supply system has a power supply switching means for switching and supplying the DC power output from the stationary rapid charger, which makes it possible to rapidly charge each of a first electric moving body equipped with a rapid-charging control means, and a second electric moving body which is not equipped with the rapid-charging control means, by using a single stationary rapid charger. As a result, even if such a traffic society comes to exist in which the first electric moving body and the second electric moving body of different charging methods are mixed and used, it becomes possible to perform rapid charging on the respective electric moving bodies smoothly without causing confusion.

In addition, according to the invention defined by claim 1, the power feeding control means discontinues power feeding from the stationary rapid charger to the stationary electric storage means during charging of the electric storage means of the first electric moving body with the DC power output from the stationary electric storage means. Thus, if the power supply is a commercial AC power supply, rapid charging can be performed on the first electric moving body with only the electric power stored in the stationary electric storage means without causing excessive burden on energy transmission and distribution systems of electric power companies. Accordingly, upon rapid charging using the first charging circuit, maximum electric power required by the rapid charging of the first electric moving body can be supplied at once from the stationary electric storage means to the first electric moving body, which makes it possible to perform ultrahigh speed charging. As a result, it becomes possible to perform rapid charging on the first electric moving body with a similar length of time required for fueling gasoline automobiles. This shortens time to wait for charging and improves utilization efficiency of the charging facilities.

According to the invention defined by claim 2, a part of the electric power stored in the stationary electric storage means is usable for rapid charging of the on-vehicle electric storage means of the second electric moving body through the stationary rapid charger. Thus, even in a case of rapid charging of the second electric moving body at peak hour, for example, for the need for electric power, it becomes possible to avoid placing a great burden on the energy transmission and distribution system.

According to the invention defined by claim 3, the stationary electric storage means is connected with an inverter for converting DC power into AC power and supplying the converted AC power to a commercial electric power system. Thus, it becomes possible to supply the electric power stored in the stationary electric storage means to the commercial electric power system, thereby leveling electric power load.

According to the invention defined by claim 4, the stationary rapid charger is capable of supplying DC power in which neither a voltage nor a current is controlled for rapid charging. Thus, even if the first electric moving body is connected to the second charging circuit, it becomes possible to perform rapid charging on the first electric moving body by using the rapid-charging control means of the first electric moving body.

According to the invention defined by claim 5, the first electric moving body has a power converter for converting AC power from a commercial AC power supply or a non-contact power feeding means connected to the stationary electric storage means side into DC power, and the rapid-charging control means is connected with an output side of the power converter. Thus, operations for connecting the charging connector will not be necessary, thereby significantly reducing labor for the charging operation.

According to the invention defined by claim 6, the electric power input to the stationary rapid charger is electric power generated by utilizing renewable energy. Thus, it becomes possible to use electric power that does not produce $CO_2$ for rapid charging, thereby preventing global warming.

DESCRIPTION OF EMBODIMENTS

Next, Embodiments of the present invention will be described in detail with reference to accompanying figures.

Figure 1:
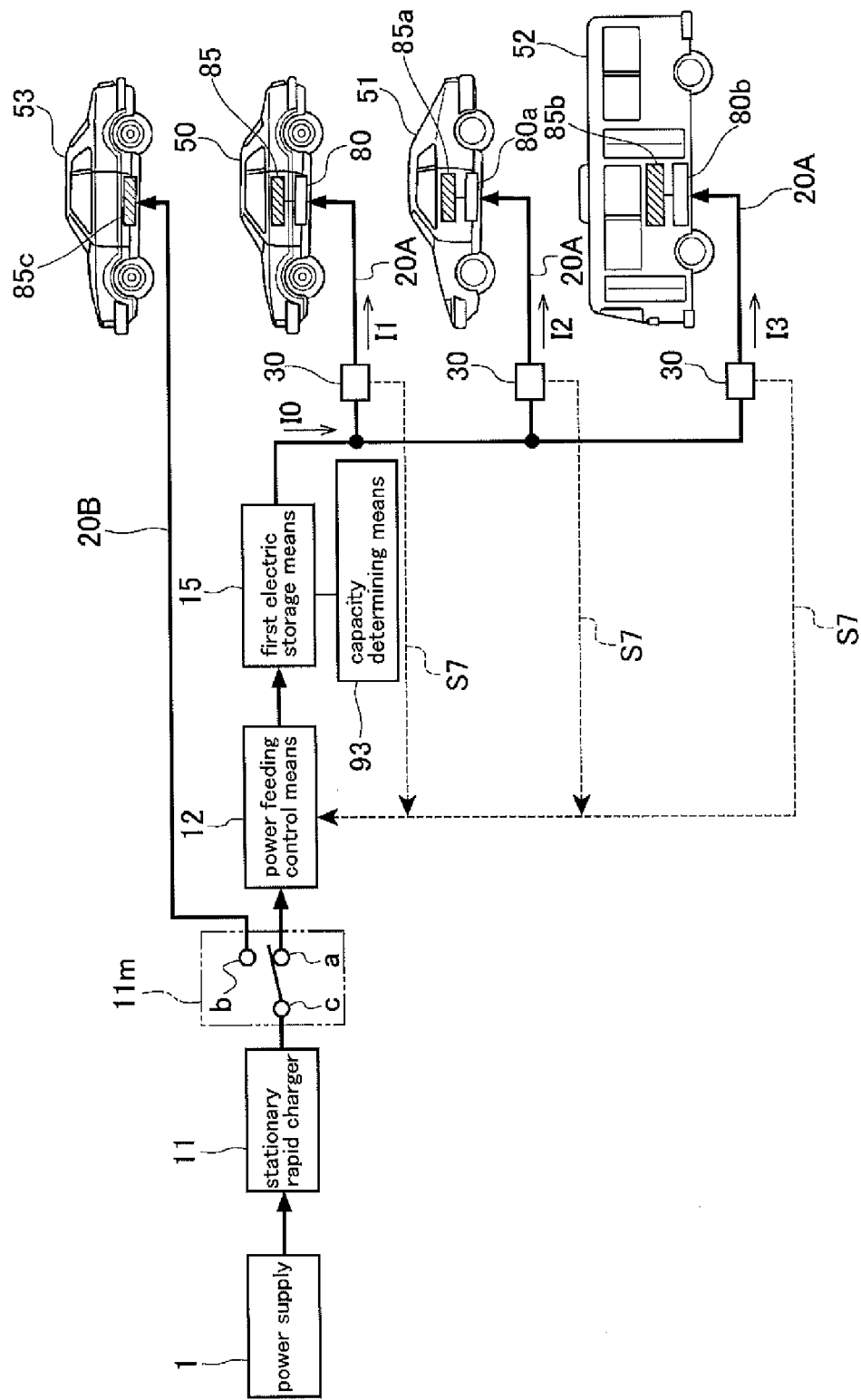
FIG. 1 is a schematic diagram of a rapid charging power supply system according to Embodiment 1 of the present invention.
Figure 2:
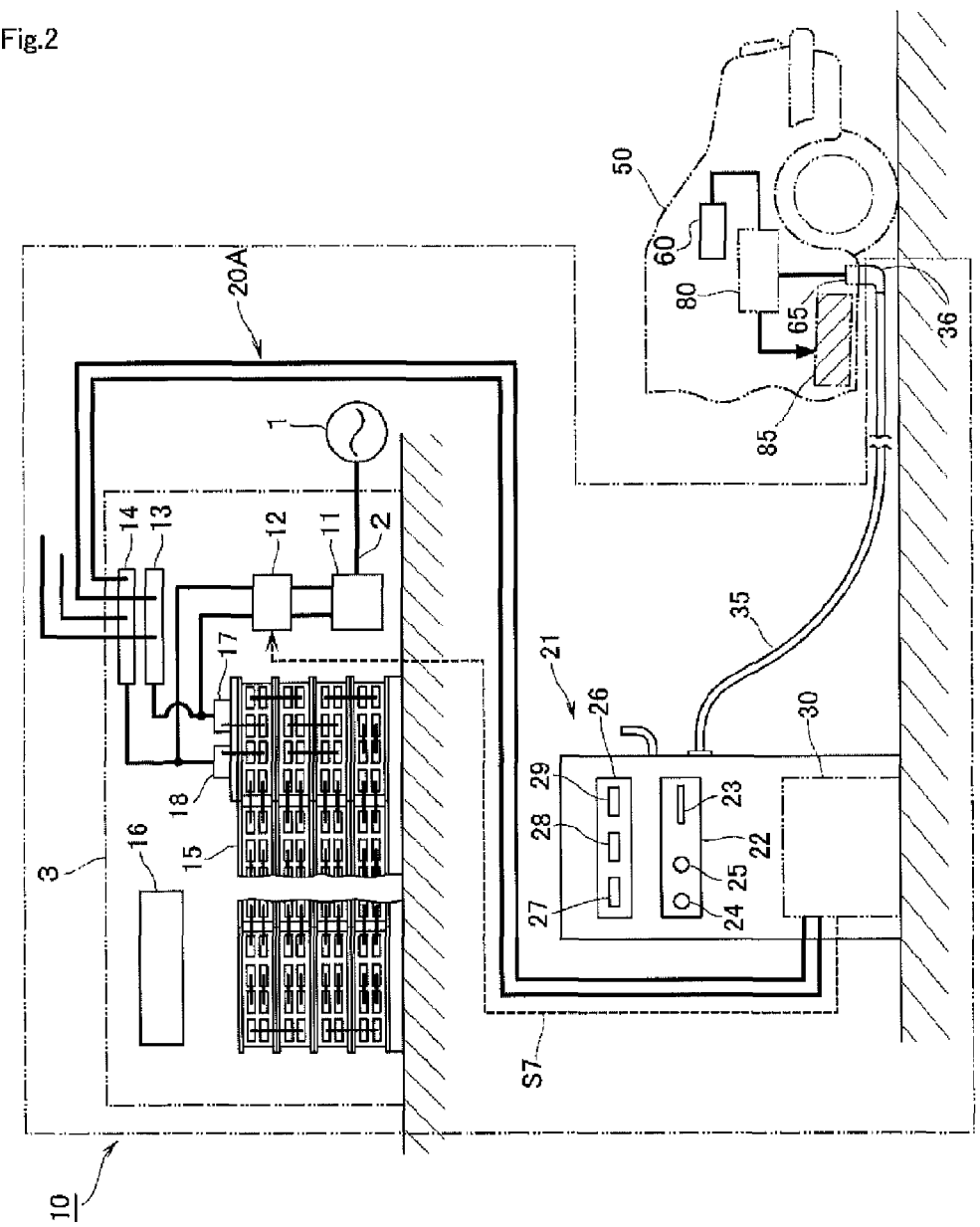
FIG. 2 is a front view of the vicinity of a stationary electric storage means and a charging terminal in the rapid charging power supply system in FIG. 1.

(Embodiment 1) FIGS. 1 to 10 show Embodiment 1 according to the present invention. In FIG. 2, reference numeral 1 indicates a commercial AC power supply as a power source, and a three-phase AC power supply, for example, is used as an AC power supply 1. Power from the AC power supply 1 is supplied into a building 3 through an electric power line 2. Within the building 3, there are a stationary rapid charger 11, a power supply switching means 11m, a power feeding control means 12, a first electric storage means 15 functioning as a stationary electric storage means, and other devices, which constitute a rapid charging power supply system 10. The input side of the stationary rapid charger 11 is connected to the electric power line 2 within the building 3. The stationary rapid charger 11 has a function of regulating three-phase AC power from the electric power line 2 to a predetermined voltage value, and converting it into DC power.

Figure 10:
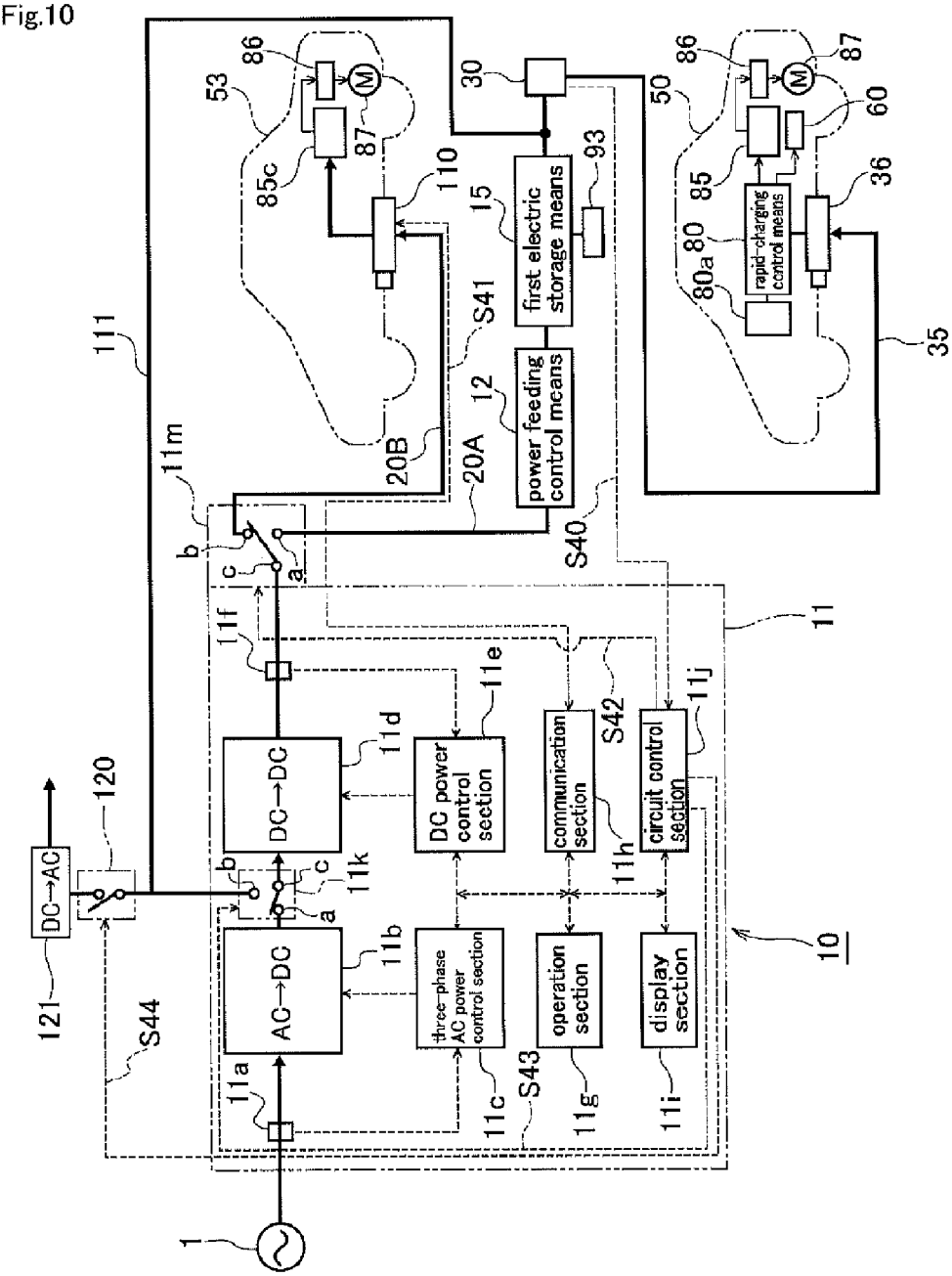
FIG. 10 is a block diagram showing a brief overview of a stationary rapid charger in the rapid charging power supply system in FIG. 1.

The output side of the stationary rapid charger 11 is connected to the power supply switching means 11m. In Embodiment 1, the power supply switching means 11m as shown in FIG. 10 is integrated with the stationary rapid charger 11. The power supply switching means 11m is constituted of a first fixed contact point a, a second fixed contact point b, and a moving contact c. The moving contact c of the power supply switching means 11m is contactable with either of the first fixed contact point a or the second fixed contact point b based on a signal S42 from a circuit control section 11j as shown in FIG. 10. The side proximate to the first fixed contact point a of the power supply switching means 11m is connected through a power feeding control means 12 to the first electric storage means 15. The power feeding control means 12 has a function of stopping DC power output from the stationary rapid charger 11 to the first electric storage means 15 based on a signal S7 from the opening/closing means 30, as will be discussed below.

The first electric storage means 15 has a function of storing DC power from the stationary rapid charger 11. The first electric storage means 15 may be of any type so long as the means can store DC power, while the first electric storage means 15 is constituted of at least one of a storage battery and an electric double layer capacitor in the present embodiment. The first electric storage means 15 may be constituted of only a valve regulated lead storage battery, for example, in which a large number of cells are connected in series; or the first electric storage means 15 may be constituted of a storage battery and a double layer capacitor used together. In addition, the first electric storage means 15 may be constituted of only a large capacity double layer capacitor. Furthermore, the storage battery may be constituted of a large capacity lithium-ion battery although this is expensive. The stationary rapid charger 11 has a function of rapidly charging a vehicle 53, which is a second electric moving body that is not equipped with a rapid-charging control means 80, by the control of appropriate charging voltage and charging current, and is for charging a first electric storage means 15 functioning as a stationary electric storage means; and the stationary rapid charger 11 has a charging function with the charging characteristics of the first electric storage means 15 taken in consideration. On the side proximate to the first electric storage means 15, a sensor (not shown in figures) for detecting the charging voltage and charging current of the first electric storage means 15 is provided, and the first electric storage means 15 is charged by the stationary rapid charger 11 based on the detected charging voltage and charging current. In the present embodiment, while open voltage of the first electric storage means 15 is, for example, about DC 380V, the open voltage can be varied by increasing or decreasing cells. A large number of cells constituting the first electric storage means 15 are such that the charging balance thereof is maintained by a battery management system (BMS) (not shown) using a passive cell balance method or an active cell balance method.

The rapid charging power supply system 10 has a function of detecting remaining capacity (remaining electric energy) of the first electric storage means 15. As shown in FIGS. 1 and 10, the first electric storage means 15 is connected with a capacity determining means 93 for calculating remaining capacity of the first electric storage means 15. The capacity determining means 93 has a function of calculating remaining capacity of the first electric storage means 15 based on information from a first electric power sensor (not shown in figures) provided on the output side of the first electric storage means 15 and a second electric power sensor (not shown in figures) provided on the input side of the first electric storage means 15. Determination information from the capacity determining means 93 is input into a power feeding control means 12, which will be described below. The power feeding control means 12 is configured to continue feeding power to the first electric storage means 15 if the capacity determining means 93 determines that the remaining capacity of the first electric storage means 15 is equal to or less than a predetermined value, even if a second electric moving body, vehicle 50, requests charging of power.

As shown in FIG. 2, the first electric storage means 15 has a positive terminal strip 17 and a negative terminal strip 18. The positive terminal strip 17 and negative terminal strip 18 are connected through a power feeding control means 12 to the output side of the stationary rapid charger 11. A positive common terminal strip 13 and a negative common terminal strip 14, constituting a part of a first charging circuit 20A, are provided for the building 3. The positive common terminal strip 13 and the negative common terminal strip 14 are for supplying DC power from the first electric storage means 15 to a plurality of charging stations 21 disposed outside the building 3. The positive common terminal strip 13 and the negative common terminal strip 14 are connected through the first charging circuit 20A to an opening/closing means 30 of a charging station 21. In this regard, the first charging circuit 20A means an electric circuit for supplying the DC power from the first electric storage means 15 to a first electric moving body, vehicle 50, which will be described below. As shown in FIG. 1, since a plurality of vehicles are charged at the same time in the present embodiment, a plurality of charging circuits 20A are connected in parallel to the positive common terminal strip 13 and the negative common terminal strip 14. Within the building 3, an air conditioner 16 is provided for maintaining the temperature of the room nearly constant throughout the year, and the temperature of the room is maintained nearly constant throughout the year so that the life of the first electric storage means 15 is prolonged.

In FIG. 2, the charging station 21 is provided within a charging station near the building 3. The charging station includes a plurality of charging terminals 21 provided therein, and each charging terminal 21 is configured such that DC power is supplied through the charging circuit 20A from the first electric storage means 15. The charging terminal 21 has, on its side portion, an operation section 22 and a display section 26. The operation section 22 is provided with a charge card reader 23, a charging start switch 24, and a charging forced stop switch 25. The display section 26 is provided with a charge amount indicator 27, a charging current indicator 28, and a charging rate indicator 29. An opening/closing means 30 housed in the charging terminal 21 is connected with a charging cable 35, which constitutes a part of the charging circuit 20. The charging cable 35 is retained on a side surface of the charging terminal 21 except when used for charging, and the charging cable 35 is extendable to a moving body, vehicle 50, during charging. The tip portion of the charging cable 35 is provided with a charging plug 36, which is connectable with a charging connector 65 of the vehicle 50.

Figure 3:
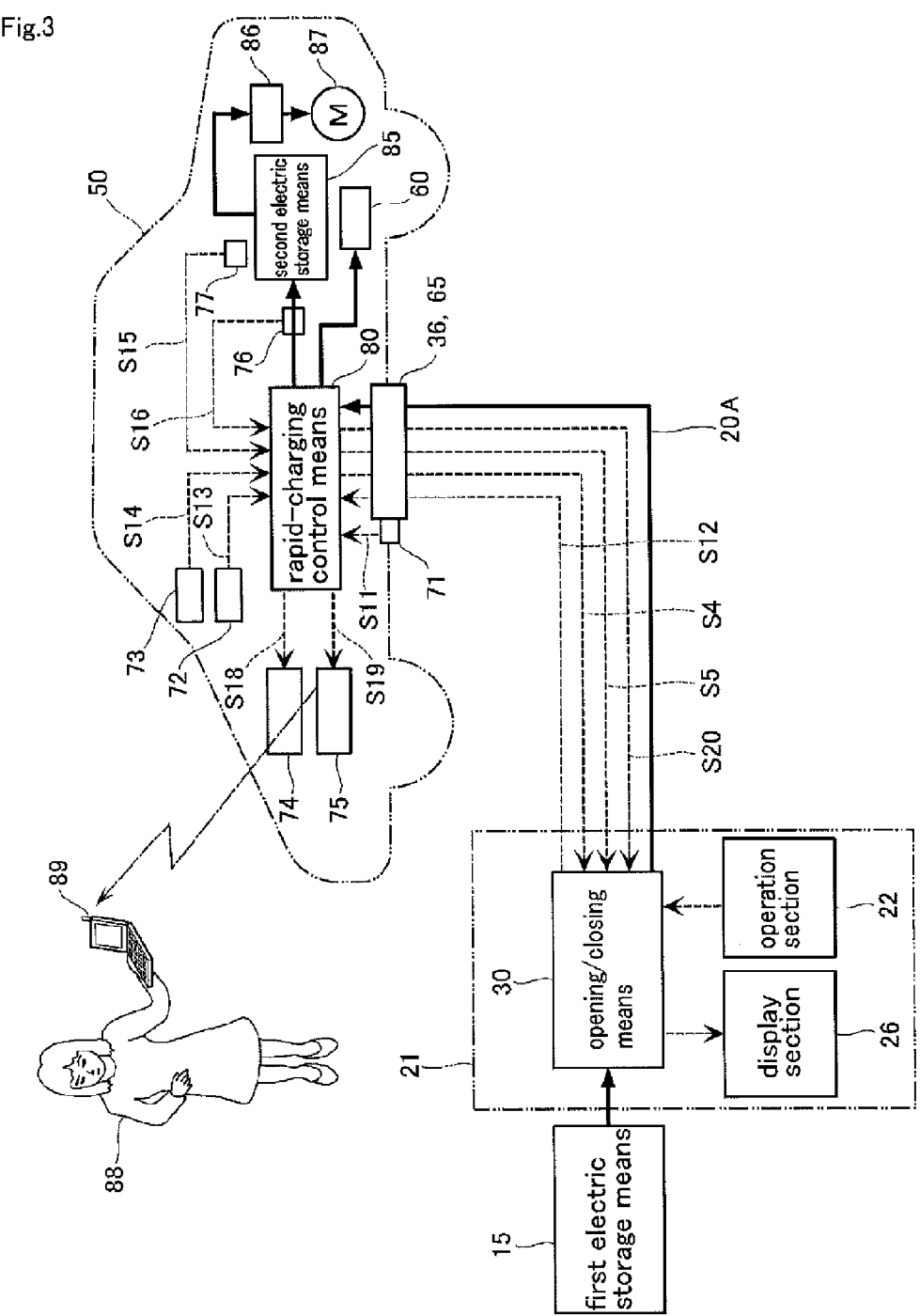
FIG. 3 is an electrical circuit diagram showing a connection relationship between an opening/closing means and a vehicle of the rapid charging power supply system in FIG. 1.

FIG. 3 shows a connection relationship between a charging terminal 21 and a vehicle 50 during charging. The charging plug 36 of the charging cable 35 is connected to a charging connector 65 of a vehicle 50 as a first electric moving body. The DC power from the first electric storage means 15 is supplied via the opening/closing means 30, provided in midway of the charging circuit 20, to the vehicle 50. The opening/closing means 30 has a function of performing opening/closing operation by the signal from the operation section 22 of the charging terminal 21, or by the signal from the vehicle 50, to supply or stop supplying the DC power from the first electric storage means 15 to the vehicle 50. The DC power from the opening/closing means 30 is supplied through a charging circuit 20A to the vehicle 50.

Figure 4:
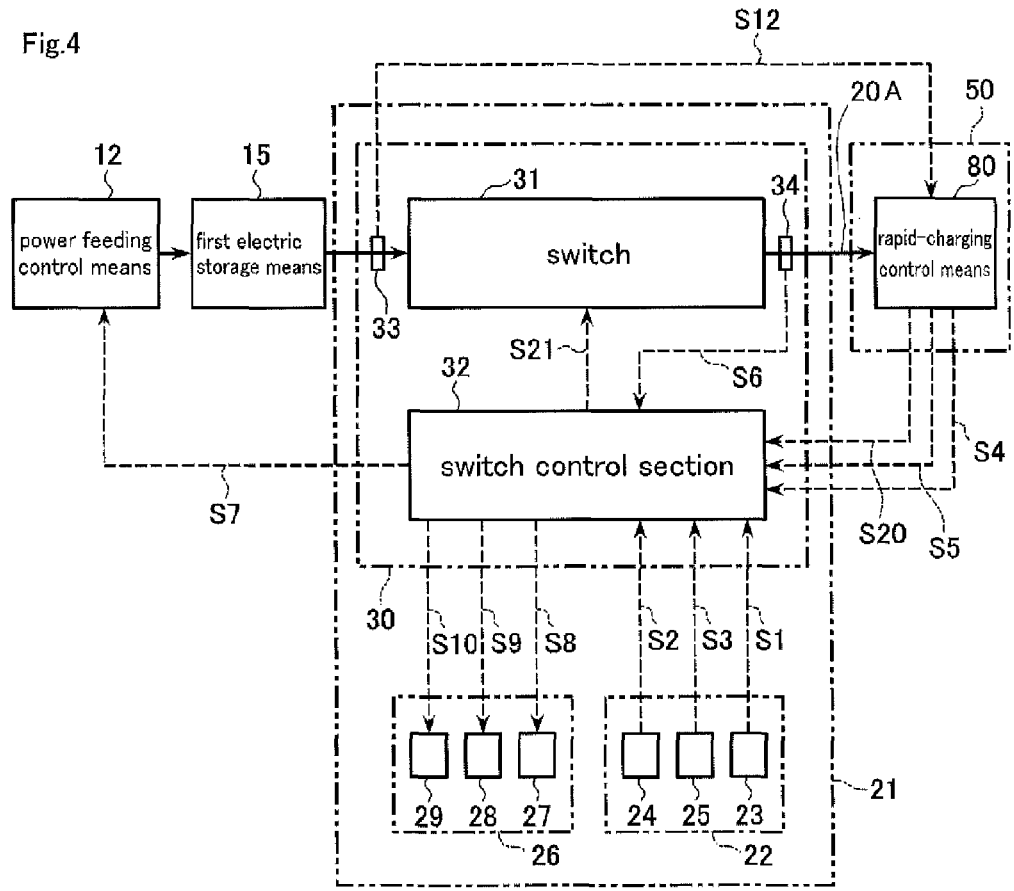
FIG. 4 is an electrical circuit diagram of an opening/closing means of the rapid charging power supply system in FIG. 1.
Figure 5:
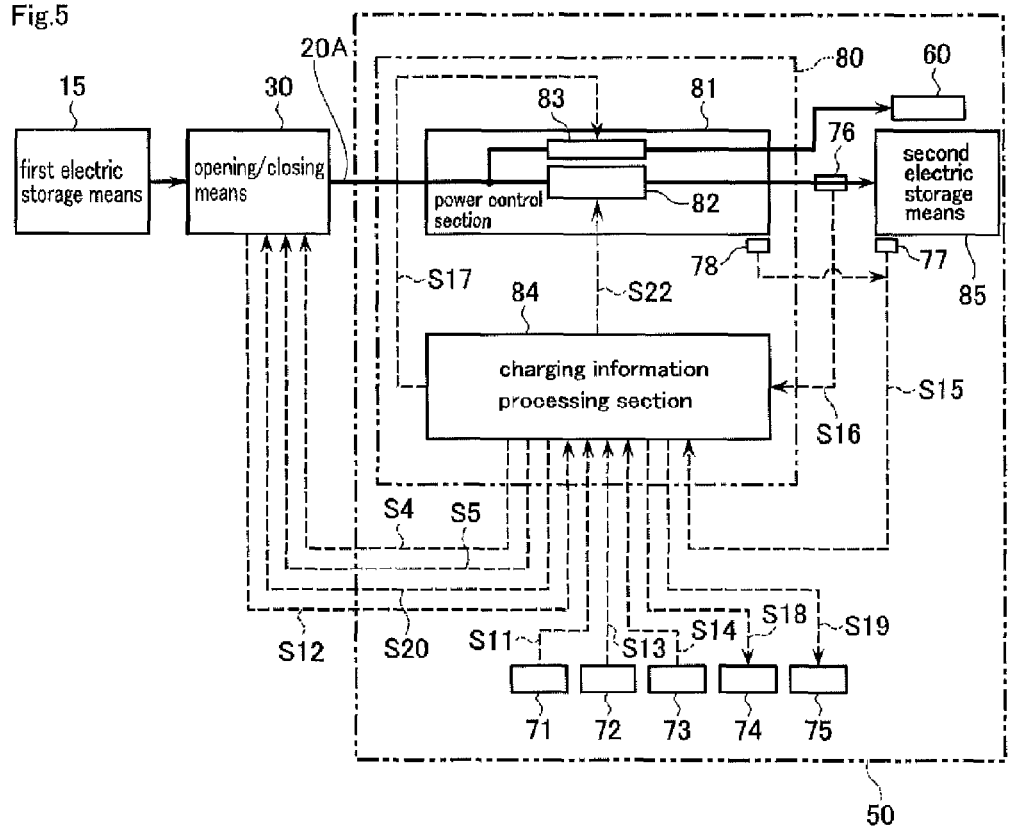
FIG. 5 is an electrical circuit diagram of a charge control means for vehicles in the rapid charging power supply system in FIG. 1.
Figure 8:
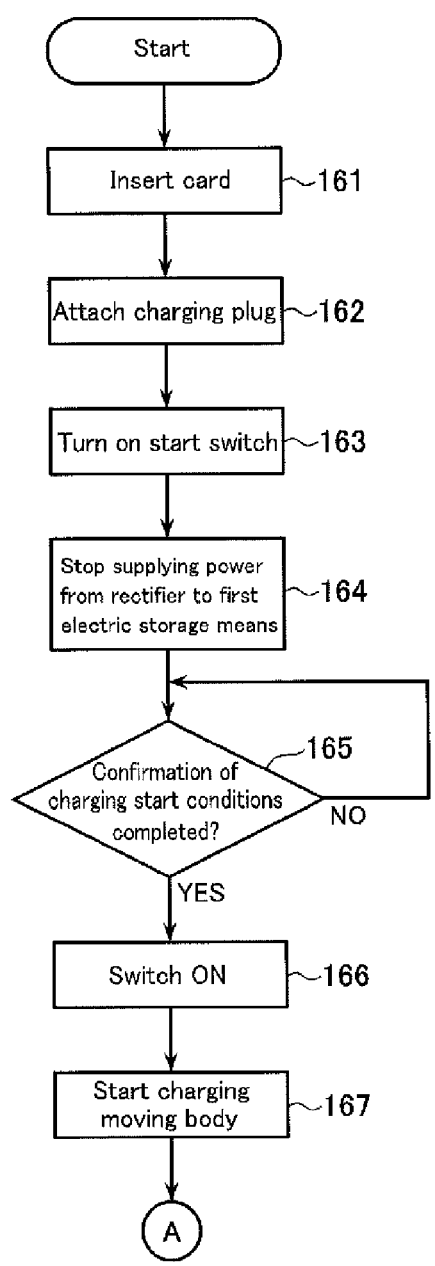
FIG. 8 is a flowchart showing a charging procedure in the rapid charging power supply system in FIG. 1.

FIG. 4 shows the details of the opening/closing means 30. The opening/closing means 30 has a switch 31 and a switch control section 32. The switch 31 has an opening/closing function of supplying or stopping supplying the DC power supplied from the first electric storage means 15, and the switch 31 is formed of a semiconductor element or an electromagnetic contractor. The switch 31 is configured to perform an opening/closing operation based on a signal S21 from the switch control section 32. The output side of the switch 31 is provided with an electric sensor 34. The electric sensor 34 has a function of detecting voltage and current of the DC power on the output side of the switch 31. The switch control section 32 is configured such that a signal S6 from the electric sensor 34 is input thereto. Furthermore, the switch control section 32 is such that a signal S1 from the charge card reader 23 and a signal S2 from the charging start switch 24, and a signal S3 from the charging forced stop switch 25 are inputtable thereto. Moreover, the switch control section 32 is such that signals S4, S5, and S20 from the charge control means 80 of the vehicle 50 are inputtable thereto. The switch control section 32 has a function of outputting a power feed stopping signal S7 to the power feeding control means 12 based on the input signal. Specifically, the switch control section 32 has a function of outputting a power feed stopping signal S7 to the power feeding control means 12 based on the signal S2, which is input by the charging start switch 24, to stop supplying the DC power to the first electric storage means 15, as shown in FIGS. 5 and 8. From the switch control section 32, signals S8, S9, and S10 are output to the display section 26 of the charging terminal 21. The signal S8 is a signal for causing the charge amount indicator 27 to display a charge amount (supplied electric energy) since the beginning of the charging. The signal S9 is a signal for causing the charging current indicator 28 to display the charging current which flows from the switch 31 to the side towards the vehicle 50. The signal S10 is a signal for causing the charging rate indicator 29 to display an electric power rate that corresponds to the electric energy supplied to the vehicle 50 from the beginning to the end of the charging. Note that the switch 31 is provided for the sake of convenience, and the rapid charging of the vehicle 50 can be performed even without the switch 31 so long as the first charging circuit 20A is provided.

As shown in FIG. 3, the vehicle 50 is equipped with the rapid-charging control means 80 and various other devices. The DC power supplied to the vehicle 50 is controlled by the rapid-charging control means 80 to have a predetermined voltage and current, which are then supplied to a second electric storage means 85, functioning as an on-vehicle electric storage means. The second electric storage means 85 can be of any type so long as it has a function of storing DC power, while the second electric storage means 85 in the present embodiment is formed of at least one of a storage battery, an electric double layer capacitor, and a lithium-ion capacitor. In the present embodiment, while the second electric storage means 85 is formed, for example, of only a lithium-ion battery in which a large number of cells are connected in series, the second electric storage means 85 may have a configuration in which a storage battery and a double layer capacitor or a lithium-ion capacitor are used in combination. The DC power stored in the second electric storage means 85 can be supplied via the controller 86 to a running motor 87, and the vehicle 50 can run with the running motor 87 as a drive source. A large number of cells constituting the second electric storage means 85 are such that the charging balance thereof is maintained by a battery management system (BMS) (not shown) using a passive cell balance method or an active cell balance method. The vehicle 50 is equipped with a cooling unit 60 for cooling a heat-generating part in the charging system.

FIG. 5 shows the details of a rapid-charging control means 80. The rapid-charging control means 80 has a power control section 81, a charging information processing section 84. The power control section 81 is formed of a charging control unit 82 and a temperature control unit 83. The charging control unit 82 has a rapid charging control function of controlling the DC power from the opening/closing means 30 to have a charging voltage and a charging current adapted for the second electric storage means 85. The charging control unit 82 has a DC chopper circuit (a DC chopper circuit in which a step-up chopper circuit and a step-down chopper circuit are used in combination therein), and a current control circuit. The charging control unit 82 has a function of chopper-controlling the DC power supplied from the first electric storage means 15 based on a control signal S22 from the charging information processing section 84 to charge the second electric storage means 85 with an optimum charging voltage. The voltage and current output from the charging control unit 82 to the second electric storage means 85 are measured by an output sensor 76, and a signal S16 from the output sensor 76 is input to the charging information processing section 84. With regard to the charging of lithium-ion batteries, it particularly requires high controlling accuracy for the charging voltage, and thus the controlling of charging with high accuracy in consideration of this fact is performed by the rapid-charging control means 80. The charging control unit 82 has DC chopper circuit in which a step-up chopper circuit and a step-down chopper circuit are used in combination. Thus, even if the voltage of the first electric storage means 15 is gradually decreased during the charging of the vehicle 50, the voltage from the first electric storage means 15 is controlled by the DC chopper circuit of the charging control unit 82, thereby charging the second electric storage means 85 with an optimum voltage. Accordingly, the change in output voltage of the first electric storage means 15 during rapid charging does not influence the charging of the second electric storage means 85. As such, the charging information processing section includes a charging program pre-input therein for performing an optimum rapid charging control on the second electric storage means 85 based on the battery voltage and charging current detected of the second electric storage means 85.

A silicon carbide (SiC) semiconductor, a gallium nitride (GaN) semiconductor or other power semiconductors are used for the rapid-charging control means 80 with the intention of low loss due to power conversion or the use at high temperatures. In addition, the use of these power semiconductors to the rapid-charging control means 80 allows for the reduction in size and weight of the rapid-charging control means 80, which significantly facilitates the mounting of the rapid-charging control means 80 in the vehicle 50. Furthermore, these power semiconductors have high power conversion efficiency. Accordingly, there is not much heat generated from the rapid-charging control means 80, and the rapid-charging control means 80 can be sufficiently cooled down using a cooling unit 60 with a thermoelectric cooling device 61 used therewith, which will be described below.

As shown in FIG. 10, the vehicle 50 has a charging history recording means 80*a* for recording charging history of the second electric storage means 85 by the rapid-charging control means 80. The charging history recording means 80*a* is connected to the rapid-charging control means 80, for recording charging results (charging data, such as charging voltage, charging current, and charging time, at rapid charging) for each charging of the second electric storage means 85 by the rapid-charging control means 80. The vehicle 50 is able to speculate the life of the second electric storage means 85 by understanding the number of times of charging and the charging results through the charging history recording means 80*a*. The information of the charging history recording means 80*a* equipped in the vehicle 50 can be received by a data center (not shown) via wireless or other means, and the owner of the vehicle 50 will know that the time for replacement of the second electric storage means 85 is coming soon based on the information from the data center.

As shown in FIG. 5, a large number of signals are input to and output from the charging information processing section 84 of the rapid-charging control means 80. The voltage measurement sensor 33 provided on the input side of the switch 31 in FIG. 4 has a function of measuring output voltage of the first electric storage means 15, and a signal S12 from the voltage measurement sensor 33 is input to the charging information control processing section 84 when charging is started. When the output voltage (open voltage) of the first electric storage means 15 is within a predetermined range, a signal S5 is output from the charging information processing section 84 to the switch control section 32 of the opening/closing means 30, the signal S5 meaning that rapid charging of the vehicle 50 is allowed.

As shown in FIG. 3, the vehicle 50 is provided with a lock sensor 71, an operation start-up confirming sensor 72, a parking brake sensor 73, a charge amount indicator 74, and a charging complete alarm 75. The lock sensor 71 has a function of confirming that the charging plug 36 is connected to the charging connector 65 of the vehicle 50. Before charging starts, a signal S11 from the lock sensor 71 is input to the charging information control processing section 84. The operation start-up confirming sensor 72 has a function of confirming the start-up of the vehicle 50. Before charging starts, a signal S13 from the operation start-up confirming sensor 72 is input to the charging information control processing section 84. The parking brake sensor 73 has a function of confirming that the parking brake is in operation so that the vehicle 50 will not move during the charging. Before charging starts, a signal S14 from the parking brake sensor 73 is input to the charging information control processing section 84. The charge amount indicator 74 has a function of displaying remaining electric energy of the second electric storage means 85. While the vehicle 50 is being charged, a signal S18 from the charging information control processing section 84 is output to the charge amount indicator 74.

The charging complete alarm 75 has a function of notifying the driver 88 that the second electric storage means 85 has reached its full charge. During the charging, the charging current flowing into the second electric storage means 85 is measured by the current sensor 76, and the charging information processing section 84 determines as to whether or not the second electric storage means 85 has been fully charged based on a signal S16 from the current sensor 76. When the second electric storage means 85 is determined as being fully charged, the charging information control processing section 84 outputs a signal S19 to the charging complete alarm 75. The charging complete alarm 75 has a function of wirelessly notifying the completion of the charging to a mobile phone 89 possessed by the driver 88. If there is any abnormality confirmed in the charging function of the vehicle 50 during the charging, a signal S20 is output from the charging information control processing section 84 to the switch control section 32 of the opening/closing means 30, at which the charging to the vehicle 50 is discontinued by a shutoff operation of the switch 31. The notification of the completion of charging may be configured to be performed by a communication means or the like dedicated for the vehicle, besides the mobile phone 89.

Figure 6:
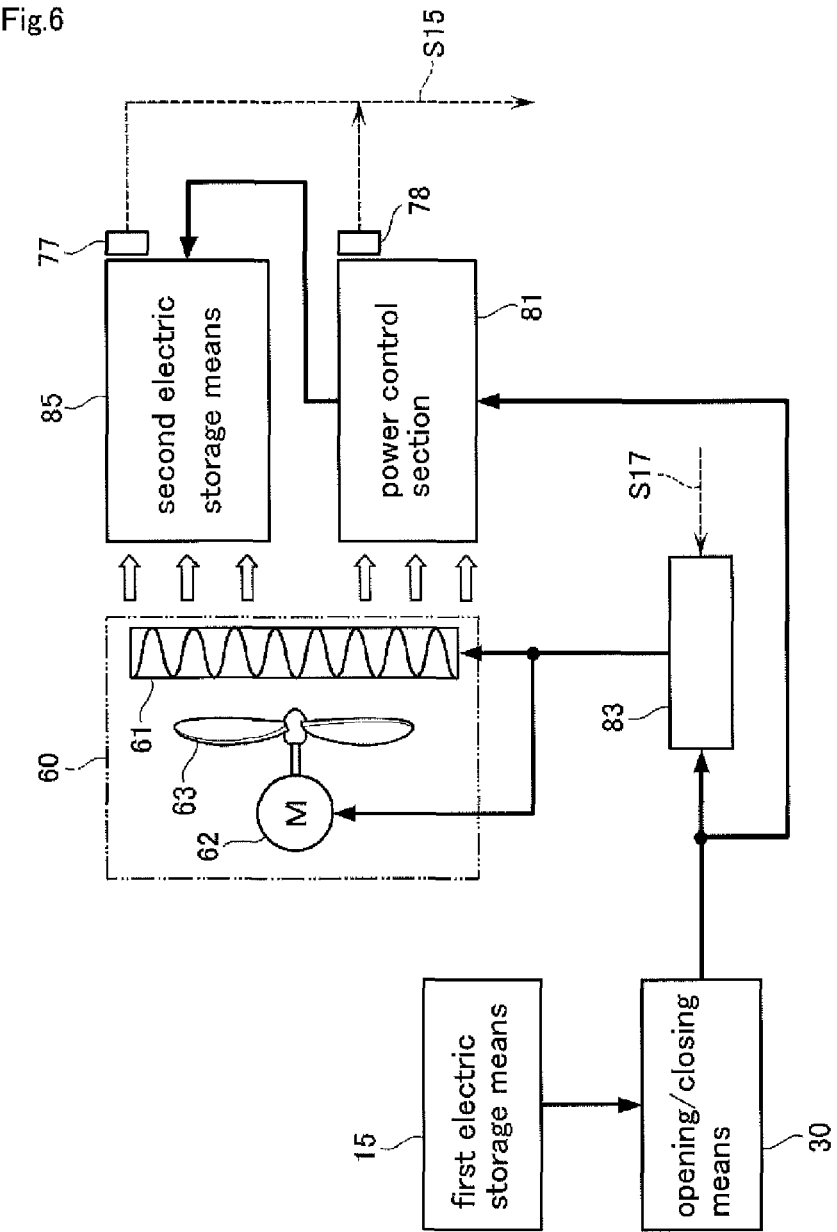
FIG. 6 is a schematic diagram of a cooling unit for vehicles in the rapid charging power supply system in FIG. 1.

FIG. 6 shows a configuration of a cooling unit 60 for cooling down the charging system of the vehicle 50 functioning as a first electric moving body. The cooling unit 60 has a thermoelectric cooling device 61, a motor 62, and a fan 63. The fan 63 is rotatably driven by the motor 62 to blow air towards a cooling surface of the thermoelectric cooling device 61. The thermoelectric cooling device 61 utilizes Peltier effect, and operates using the DC power from the first electric storage means 15. The first temperature sensor 77 and second temperature sensor 78 are provided at portions which are easily heated in the charging system of the vehicle 50. The first temperature sensor 77 has a function of detecting the temperature of the second electric storage means 85. The second temperature sensor 78 has a function of detecting the temperature of the power control section 81. The signal S15 from the first temperature sensor 77 and second temperature sensor 78 is input to the charging information processing section 84. The charging information processing section 84 is configured to output a signal S17 to the temperature control unit 83 when the temperature at a specific point in the charging system of the vehicle 50 rises above a predetermined value. The temperature control unit 83 is configured to supply DC power from the opening/closing means 30 to the cooling unit 60 based on a signal S17 from the charging information processing section 84.

The power control section 81 controls the large amount of electric power supplied from the first electric storage means 15 during rapid charging, and thus the temperature may rise in the semiconductor element. Furthermore, the lithium-ion battery constituting the second electric storage means 85 is housed in a closely-spaced state due to the relationship with the housing space, and thus the temperature may rise during rapid charging. Accordingly, the power control section 81 and second electric storage means 85 are forcibly cooled down by cool air from the cooling unit 60 when the temperature rises above a predetermined value due to rapid charging. In order to increase the cooling ability of the semiconductor element of the power control section 81, which is particularly easy to be heated to a high temperature, it is also possible to apply a structure of directly attaching the thermoelectric cooling device 61 to the power control section 81. A cooling structure with the thermoelectric cooling device 61 is used in the present embodiment. However, when electric power supplied from the first electric storage means 15 is used, a cooling structure in which a radiator and a motor-driven fan are used in combination, or a cooling structure in which air forcibly cooled down by a heat exchanger is used, may be used, besides the thermoelectric cooling device 61.

FIG. 10 shows the details of the stationary rapid charger 11. The stationary rapid charger 11 has an input-side current detecting sensor 11a, an AC-DC converter 11b, a three-phase AC power control section 11c, a DC-DC converter 11d, a DC power control section 11e, an output-side current detecting sensor 11f, an operation section 11g, a communication section 11h, a display section 11i, a circuit control section 11j, and a changeover switch 11k. The input-side current detecting sensor 11a is provided on the input side of the AC-DC converter 11b, and has a function of detecting a current value or the like being input to the AC-DC converter 11b. The AC-DC converter 11b has a function of converting commercial AC power from the power supply 1 into DC power. The three-phase AC power control section 11c performs harmonic suppression of input current, power factor improvement and the like based on signals from the input-side current detecting sensor 11a.

The changeover switch 11k is provided in between the AC-DC converter 11b and the DC-DC converter 11d. In Embodiment 1, the changeover switch 11k is a mechanical switching configuration having contact points; however, the changeover switch 11k may also be a switching configuration having no contact points, in which a semiconductor is used. The changeover switch 11k is formed of a first fixed contact point a, a second fixed contact point b, and a moving contact c. The moving contact c is contactable with either of the first fixed contact point a and the second fixed contact point b based on a signal S43 from the circuit control section 11j as shown in FIG. 10. The first fixed contact point a provided on the output side of the AC-DC converter 11b of the changeover switch 11k is connected with the input side of the DC-DC converter 11d via the moving contact c. The DC-DC converter 11d is constituted of an isolation transformer-type DC-DC converter. The DC-DC converter 11d has a function of converting a DC voltage into another DC voltage using a switching element. The DC power control section 11e performs the control of output voltage and charging current of the DC-DC converter 11d based on signals from the output-side current detecting sensor 11f.

The operation section 11g is a part for manually inputting a starting operation of rapid charging and a stop of charging and the like, and is disposed on the outer surface side of the stationary rapid charger 11. The display section 11i has a function of displaying a display necessary for operations, numerical values related to charging, and the like through, for example, a liquid crystal display. The communication section 11h is constituted of, for example, an interface of a CAN method, and the communication section 11h has a function of performing information exchanging with a vehicle 53, which does not have a rapid-charging control means 80 equipped therein. The circuit control section 11j has a function of controlling each of the power supply switching means 11m, the changeover switch 11k and the power supply switch 120 based on a signal S40 from the opening/closing means 30 and a signal from the communication section 11h. Respective parts of the stationary rapid charger 11 are connected with one another through a control circuit shown with a dotted line, and the parts perform a predetermined operation based on signals from the respective parts.

The second fixed contact point b in the changeover switch 11k of the stationary rapid charger 11 is connected, through an electric power supplying circuit 111, with the output side of the first electric storage means 15 functioning as a stationary electric storage means. As a result, the DC power output from the first electric storage means 15 can be input to the input side of the DC-DC converter 11d through the moving contact c of the changeover switch 11k. Specifically, the DC-DC converter 11d is capable of converting the DC power from the first electric storage means 15 into an electric power adapted for the rapid charging of a second electric moving body, i.e., vehicle 53, based on the switching operation of the changeover switch 11k. Furthermore, the electric power supplying circuit 111 is connected with a power supply switch 120. The power supply switch 120 is connected with an inverter 121, which converts DC power into AC power and which supplies the converted AC power to commercial electric power systems. The power supply switch 120 performs an opening/closing operation based on a signal S44 from the circuit control section 11j. In a state where the power supply switch 120 is closed, the inverter 121 converts the DC power from the first electric storage means 15 into AC power adapted to a frequency of a commercial electric power system by using a switching element, and supplies the converted AC power to the commercial electric power system. The changeover switch 11k and the power supply switch 120 are configured to be operated under certain conditions by an interlock circuit; and in a state when the power supply switch 120 is turned on, the moving contact c of the changeover switch 11k is configured to contact with only the fixed contact point a on the side proximate to the AC-DC converter 11b. In addition, in a state when the moving contact c of the changeover switch 11k is in contact with the fixed contact point b, the power supply switch 120 is either turned on or off.

As shown in FIG. 10, the circuit control section 11j receives a signal S40 from the opening/closing means 30 and a signal S41 from a vehicle 53 through a communication section 11h, and the circuit control section 11j outputs a signal S42 to the power supply switching means 11m based on the signal S40 and signal S41 to switch circuits. Specifically, the power supply switching means 11m has a function of supplying the electric power from the stationary rapid charger 11 only to the first charging circuit 20A, except for during the charging of the vehicle 53. In Embodiment 1, the power supply switching means 11m is a mechanical switching configuration having contact points; however, the power supply switching means 11m may also be a switching configuration having no contact points, in which semiconductor is used. The first fixed contact point a of the power supply switching means 11m is connected with the input side of the power feeding control means 12. The second fixed contact point b of the power supply switching means 11m is connected with the second charging circuit 20B for rapid charging of the vehicle 53 which functions as the second electric moving body. The second charging circuit 20B is mainly constituted of a charging cable having a communication line and an electric power line, and the tip portion of the charging cable includes a charging plug 110 attached thereto. The charging plug 110 is in accordance with the configuration of the charging plug 36 of the first charging circuit 20A. The second charging circuit 20B has a function of supplying electric power from a DC-DC converter 11d, the electric power being controlled to be optimum for rapid charging of a second electric storage means 85c equipped in the vehicle 53, to the vehicle 53, based on the signal S41 from the vehicle 53, which has been received by the communication section 11h. The controlling of rapid charging to vehicle 50 is performed by the rapid-charging control means 80 equipped in the vehicle 50 as described above, and thus the control of charging by the DC-DC converter 11d is not necessary for the vehicle 50.

Vehicles that are chargeable by the rapid charging power supply system 10 according to the present invention are those that use a motor as generating machinery, and the concept of the vehicles includes, besides the passenger car-type vehicle 50 in FIG. 1, a sport car 51, a bus 52, and a truck 53. Moreover, besides those types of vehicles, the vehicles as the object of rapid charging include carrier vehicles, railroad vehicles, street cars, monorail cars, construction vehicles, forklifts and the like. Since the number of cells, capacity and the like of the second electric storage means vary depending on the types of the vehicles, the sport car 51 is equipped with a second electric storage means 85a which is different from the second electric storage means of the vehicle 50. The bus 52 is equipped with a second electric storage means 85b, and the truck 53 is equipped with a second electric storage means 85c. The sport car 51 has a charging controlling function suitable for the second electric storage means 85a, and the bus 52 has a rapid charging controlling function suitable for the second electric storage means 85b. Similarly, the truck 53 has a rapid charging controlling function suitable for the second electric storage means 85c.

Figure 7:
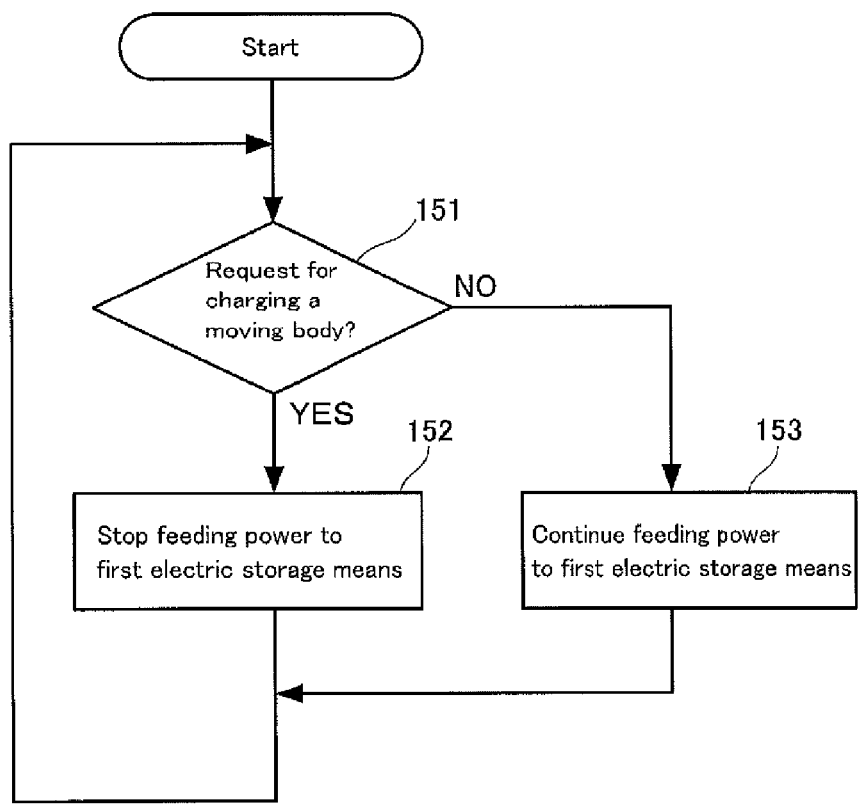
FIG. 7 is a flowchart showing a control procedure of a power feeding control means of the rapid charging power supply system in FIG. 1.

Next, a rapid charging method for an electric moving body according to Embodiment 1 will be described. FIG. 7 shows operational procedure for controlling a power feeding control means 12. In FIG. 7, Step 151 determines as to whether or not a charging request has been made for a vehicle 50 functioning as a first electric moving body. If Step 151 determines that there is a request for charging the vehicle 50, the flow proceeds to Step 152, where the opening/closing means 30 outputs a signal S7 to the power feeding control means 12, and the supply of DC power is stopped from the stationary rapid charger 11 to the first electric storage means 15. If Step 151 determines that there is no request for charging the vehicle 50, the flow proceeds to Step 153, and the supply of DC power is continued from the stationary rapid charger 11 to the first electric storage means 15. In a state where the supply of electric energy is stopped from the stationary rapid charger 11 to the first electric storage means 15, charging of DC power is possible only from the first electric storage means 15 to the vehicle 50. It should be noted, as described above, that the power feeding control means 12 is configured to continue feeding power to the first electric storage means 15 if the capacity determining means 93 determines that the remaining capacity of the first electric storage means 15 is equal to or less than a predetermined value, even if there is a request for charging power from the vehicle 50.

Figure 9:
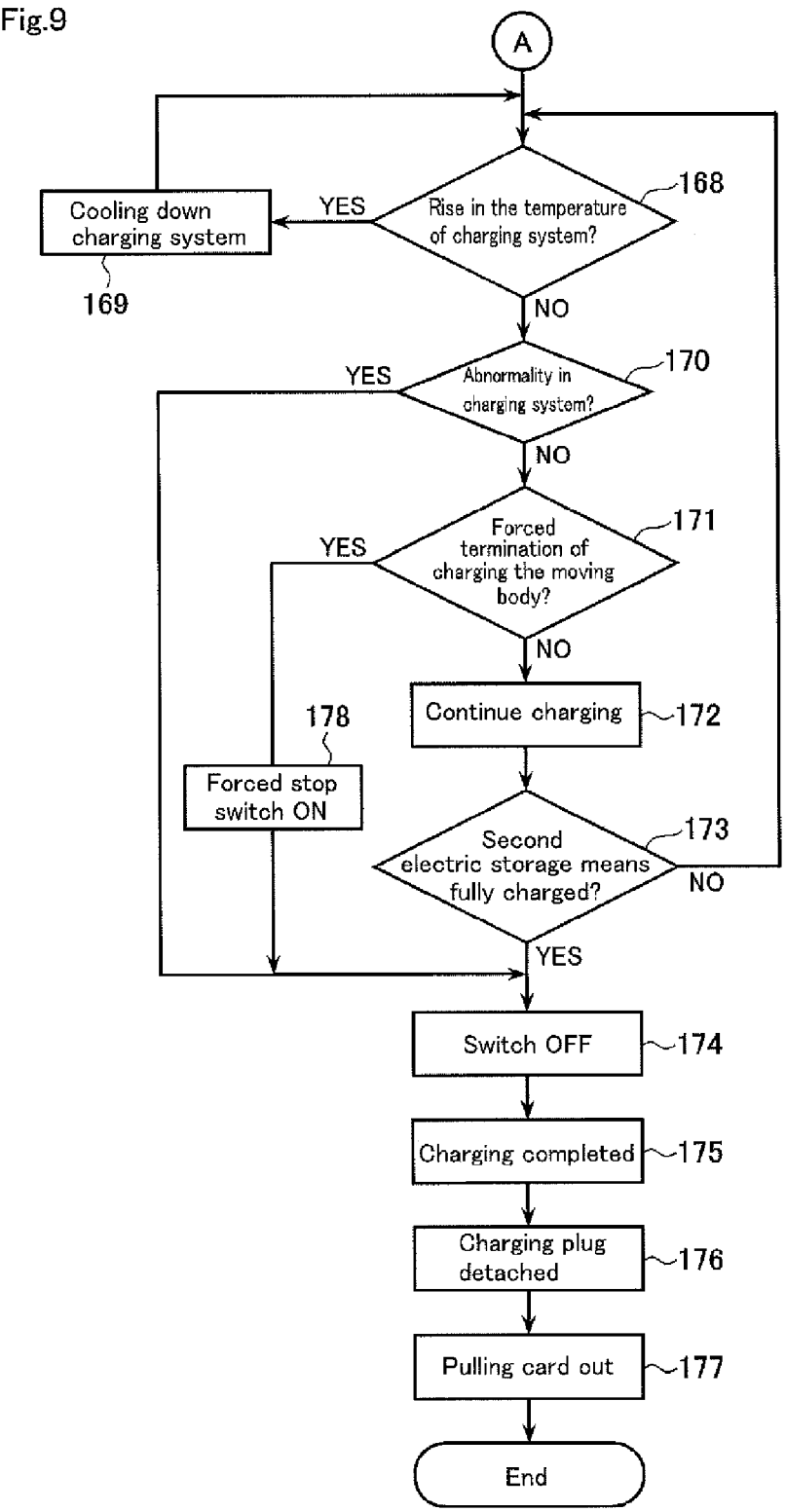
FIG. 9 is a flowchart showing a charging procedure in the rapid charging power supply system in FIG. 1, FIG. 9 being a flowchart following FIG. 8.

FIGS. 8 and 9 show operational procedure from the beginning to the end of charging of a rapid charging method for an electric moving body equipped with a rapid-charging control means 80. When a vehicle 50 functioning as a first electric moving body arrives at a charging station, the vehicle 50 makes a stop near an unoccupied charging terminal 21. Prior to the start of charging, the operational switch (not shown in figures) of the vehicle 50 is turned off, and the vehicle 50 is secured at the stop position with the operation of the parking brake (not shown in figures). Then, as shown at Step 161, a charging card (not shown in figures) is inserted into a card reader 23 of the charging terminal 21. The charging card has the same function as cash, and the insertion of the charging card into the card reader 23 enables the start for charging the vehicle 50. Next, the flow proceeds to Step 162, and a charging cable 35 retained at the charging terminal 21 is detached, and a charging plug 36 at the tip portion of the charging cable 35 is attached to a charging connector 65 of the vehicle 50. The attaching of the charging plug 36 is performed by pressing the charging plug 36 into the charging connector 65. The complete attachment thereof to the charging plug 36 means that a charging circuit 20A is connected to the vehicle 50. The attachment of the charging plug 36 is confirmed by a lock sensor 71 at the vehicle 50 side.

If the attaching of the charging plug 36 is completed, the flow proceeds to Step 163, where a charging start switch 24 of the charging terminal 21 is turned on. Next, the flow proceeds to Step 164, where the supply of electric energy is stopped from the stationary rapid charger 11 to the first electric storage means 15. In this state, the stationary rapid charger 11 and the first electric storage means 15 are electrically detached from each other, and the charging of the vehicle 50 becomes possible only by the feeding of electric energy from the first electric storage means 15. If the supply of electric energy to the first electric storage means 15 is stopped, the flow proceeds to Step 165, where it is determined as to whether or not charging start conditions for the vehicle 50 are all confirmed. Specifically, Step 165 determines as to whether or not the signal S11 from each lock sensor 71, the signal S12 from the voltage measurement sensor 33, the signal S13 from the operation start-up confirming sensor 72, and the signal S14 from the parking brake sensor 73 are being input. If Step 165 determines that the confirmation of the charging start conditions is completed, the flow proceeds to Step 166, where the switch 31 of the charging circuit 20A is turned on. Step 167 starts charging of the vehicle 50.

Next, if the charging of the vehicle 50 starts, the flow proceeds to Step 168 in FIG. 9, where it is determined as to whether or not the temperature of the charging system has risen. If Step 168 determines that the temperature of the charging system is above a predetermined value, the flow proceeds to Step 169, where the cooling unit 60 performs cooling down of the power control section 81 and the second electric storage means 85. If Step 168 determines that the temperature of the charging system is normal, the flow proceeds to Step 170, where it is determined as to whether or not there is an abnormality in the charging control function or the like of the charging system. If Step 170 determines that there is an abnormality in the charging control function or the like, the flow proceeds to Step 174, where the switch 31 is turned off and the charging is discontinued. If Step 170 determines that there is no abnormality in the charging control function or the like, the flow proceeds to Step 171. At Step 171, if the charging of the vehicle 50 is desired to be forcibly terminated, the flow proceeds to Step 178, where the charging forced stop switch 25 is turned on. If the charging forced stop switch 25 is turned on, the flow proceeds to Step 174, where the switch 31 is turned off and the charging is discontinued. The forced termination of charging is effective when the time or the like for charging is limited, and the timing for stopping the charging can be selected by reference to a charging current value displayed on the display section 26 of the charging terminal 21. The configuration in the present embodiment is such that the rise in temperature is detected in the charging system and then the cooling unit 60 is operated. However, if the cooling down of the charging system is not sufficient only by natural heat radiation, the cooling unit 60 may be configured to be operated prior to the start of the charging or simultaneously with the start of the charging.

At Step 171, if it is not necessary to end the charging of the vehicle 50, the flow proceeds to Step 172, and the charging is continued. Step 173 determines as to whether or not the second electric storage means 85 has been fully charged. This determination is made based on the measurement value of the charging current in the second electric storage means 85. Specifically, whether or not the second electric storage means 85 has been fully charged is determined by the charging information processing section 84 based on a signal S16 from the current sensor 76. If Step 173 determines that the second electric storage means 85 has been fully charged, the flow proceeds to Step 174, where the switch 31 is turned off and the charging ends. Next, the charging plug 36 is detached from the charging connector 65 of the vehicle 50. In a state where the charging is ended, charged electric energy and a charging rate are displayed on the display section 26 of the charging terminal 21. Then, the flow proceeds to Step 177, where the charging rate or the like is electrically written on the charging card (not shown in figures) inserted in the card reader 23 of the charging terminal 21, and payment procedure of the electric power rate is conducted online to a bank or the like. Then, the removal of the charging card from the card reader 23 is performed.

As such, the large amount of electric power stored in the first electric storage means 15 is used directly for the charging of the second electric storage means 85, so that the charging of the vehicle 50 becomes possible in a short period of time. Specifically, the first electric storage means 15 is able to store a large amount of electric power several hundred times larger than the electric power storage ability of the second electric storage means 85 of the vehicle 50, and there are not any charging control functions interposed between the first electric storage means 15 and the vehicle 50. Accordingly, the large amount of electric power stored in the first electric storage means 15 can be directly sent to the vehicle 50 without controlling the voltage or current, and as shown in FIG. 1, simultaneous rapid charging for a plurality of vehicles becomes possible without the need of large-scale power transformation equipment.

In the present invention, the vehicle 50 has the rapid-charging control means 80, and therefore the vehicle 50 is able to control the DC power supplied from the first electric storage means 15 to have a voltage and a current optimum for the charging of the second electric storage means 85. Specifically, the charging control function has great influence on the life or the like of the second electric storage means 85, and designing for matching the charging characteristics of the second electric storage means 85 with the charging control function becomes possible by allowing the vehicle 50 to be equipped with the charge control means 80. As a result, the second electric storage means 85 becomes able to exert expected performance, thereby increasing the performance of the vehicle 50. In addition, during the charging of the vehicle 50, the first electric storage means 15 is in a state of being electrically disconnected from the stationary rapid charger 11 which is connected with a commercial, AC power supply 1 by the power feeding control means 12, and electric power is supplied to the vehicle 50 only from the first electric storage means 15. The first electric storage means 15 which is electrically disconnected from the stationary rapid charger 11 is able to output pure DC power, and the DC power from the first electric storage means 15 is directly sent to the vehicle 50 without controlling the voltage or current. Thus, it is almost not necessary to take noise, surge or the like of supplied electric power into consideration in the designing of electric circuitry of the vehicle 50, and it becomes possible to design electricity control circuitry for the vehicle 50 on the premise that high-quality electric power is supplied. Therefore, it is almost not necessary to take ripple, noise or surge into consideration for the DC power supplied to the vehicle 50 during rapid charging, thereby facilitating the designing of electricity control circuitry of the vehicle 50 and improving the reliability of the electricity control function of the vehicle 50.

The above description is an explanation of charging procedure of only the vehicle 50; and when a plurality of vehicles are simultaneously charged as shown in FIG. 1, the time required for each of the vehicles to be fully charged varies since the capacity or charge amount is different among the second electric storage means 85, 85a and 85b. In the beginning of charging, the charging current for the vehicle 50 is I1, and the charging current for the sport car 51 is I2. Similarly, the charging current for the bus 52 is I3. If the charging for the respective vehicles is continuously performed, the charging current will be significantly decreased compared to the beginning of the charging. Further, if the vehicles are close to full charge, charging current will hardly flow. Then, if the second electric storage means 85a and 85b are fully charged, the charging will be automatically stopped for the respective vehicles.

While the cooling unit 60 is used for cooling down the charging system in the present embodiment, the thermoelectric cooling device 61 has a function of adjusting the temperature within the vehicle 50 since the thermoelectric cooling device 61 has a heat generating surface as well as a cooling surface. Thus, the cooling unit 60 can be used as an air-conditioning system within the vehicle 50, in addition to the use for cooling down of the charging system. If the cooling unit 60 with the thermoelectric cooling device 61 is used as an air-conditioning system, CFC gas or the like will not be necessary as a refrigerant in conventional air-conditioning systems, which is also desirable from the view point of improving global environment.

Next, rapid charging for a vehicle 53, which is a second electric moving body that is not equipped with a rapid-charging control means 80, will be described. As shown in FIG. 10, the vehicle 53 is equipped with neither a rapid-charging control means 80 nor a cooling unit 60. With regard to the vehicle 53, forced cooling of the charging system during rapid charging is performed by a motor-driven fan (not shown in figures) or the like, utilizing electric power from another electric storage means (not shown in figures) equipped in the vehicle 53.

When the attachment of the charging plug 110 to the vehicle 53 is completed, the vehicle 53 is caused to be connected to the stationary rapid charger 11 through the second charging circuit 20B. This will allow for communication between the vehicle 53 and the stationary rapid charger 11. Next, the charging start button (not shown in figures) of the operation section 11g in the stationary rapid charger 11 is pressed. When the charging start button is pressed, the stationary rapid charger 11 transmits a status such as an outputtable range to the vehicle 53, and requests permission for charging. The vehicle 53 confirms that the status of the stationary rapid charger 11 satisfies charging start conditions, and transmits a charging permission signal. The vehicle 53 determines an optimum charging current in accordance with the state of the on-vehicle electric storage means 85c, and sends out a current command. Next, the stationary rapid charger 11 outputs charging current in accordance with the current command. As such, the stationary rapid charger 11 successively determines an optimum charging current in accordance with the state of the on-vehicle electric storage means 85c, and sends out a current command, to perform rapid charging on the on-vehicle electric storage means 85c. In addition, if the vehicle 53 determines the completion of charging, or an operator presses a charging end button (not shown in figures) of the operation section 11g, then the rapid charging is ended.

In a case when sufficient electric power is stored in the first electric storage means 15 functioning as a stationary electric storage means, even if the second electric moving body, vehicle 53, is being rapidly charged, rapid charging of the first electric moving body, vehicle 50, can also become possible from the electric power supply from the first electric storage means 15, as shown in FIG. 10. As a result, it becomes possible to charge vehicles 50 and 53, which have different charging methods, at the same time under a certain condition in the rapid charging power supply system 10, thereby smoothening the rapid charging.

As such, the rapid charging power supply system 10 has the power supply switching means 11m for switching and supplying the DC power output from the stationary rapid charger 11, and thus it becomes possible to perform rapid charging, using a single stationary rapid charger 11, on each of the vehicle 50 equipped with the rapid-charging control means 80 and the vehicle 53 which does not have the rapid-charging control means 80 equipped therewith. Accordingly, even if such a traffic society comes to exist in which the vehicles 50 and 53 of different charging methods are mixed and used, it becomes possible to perform rapid charging on the respective vehicles 50 and 53 smoothly without causing confusion.

Power feeding is discontinued from the stationary rapid charger 11 to the stationary electric storage means, i.e., first electric storage means 15, by the power feeding control means 12, during the charging of the second electric storage means 85 of the vehicle 50 with DC power output from the stationary electric storage means, i.e., first electric storage means 15. Thus, if the power supply 1 is a commercial AC power supply, rapid charging can be performed on the vehicle 50 with only the electric power stored in the first electric storage means 15 without causing excessive burden on the power supply 1 side. Accordingly, when rapid charging is performed using the charging circuit 20A, maximum electric power required by the vehicle 50 for rapid charging can be supplied at once to the vehicle 50 from the first electric storage means 15, which makes it possible to perform ultrahigh speed charging. As a result, it becomes possible to perform rapid charging on the vehicle 50 with a similar length of time required for fueling gasoline automobiles. This shortens time to wait for charging and improves utilization efficiency of the charging facilities.

Part of the electric power stored in the stationary electric storage means, i.e., first electric storage means 15, can be used for rapid charging of the on-vehicle electric storage means 85c of the vehicle 53 through the stationary rapid charger 11. Accordingly, even in a case of rapid charging of the vehicle 53 at peak hour, for example, for the need for electric power, it becomes possible to avoid placing a great burden on the energy transmission and distribution system. In addition, since the first electric storage means 15 is connected with the inverter 121 for converting DC power into AC power and supplying the converted AC power to a commercial electric power system, it becomes possible to supply the electric power stored in the first electric storage means 15 to the commercial electric power system through a switch 120 that is operated based on a signal S44, thereby leveling electric power load.

The stationary rapid charger 11 is also capable of controlling the DC-DC converter 11d to supply DC power which is not controlled to have a voltage for rapid charging, to the vehicle side. Even if the vehicle 50 is connected to the second charging circuit 20B, the voltage of DC power which is not controlled to be the voltage for rapid charging, can be controlled to be a charging voltage optimum for the second electric storage means 85 by using the rapid-charging control means 80, which allows for rapid charging of the vehicle 50. In addition, the electric power input into a stationary rapid charger 11 is such electric power that is generated by utilizing renewable energy. Thus, it becomes possible to use electric power that does not produce $CO_2$ for rapid charging, thereby preventing global warming.

Figure 11:
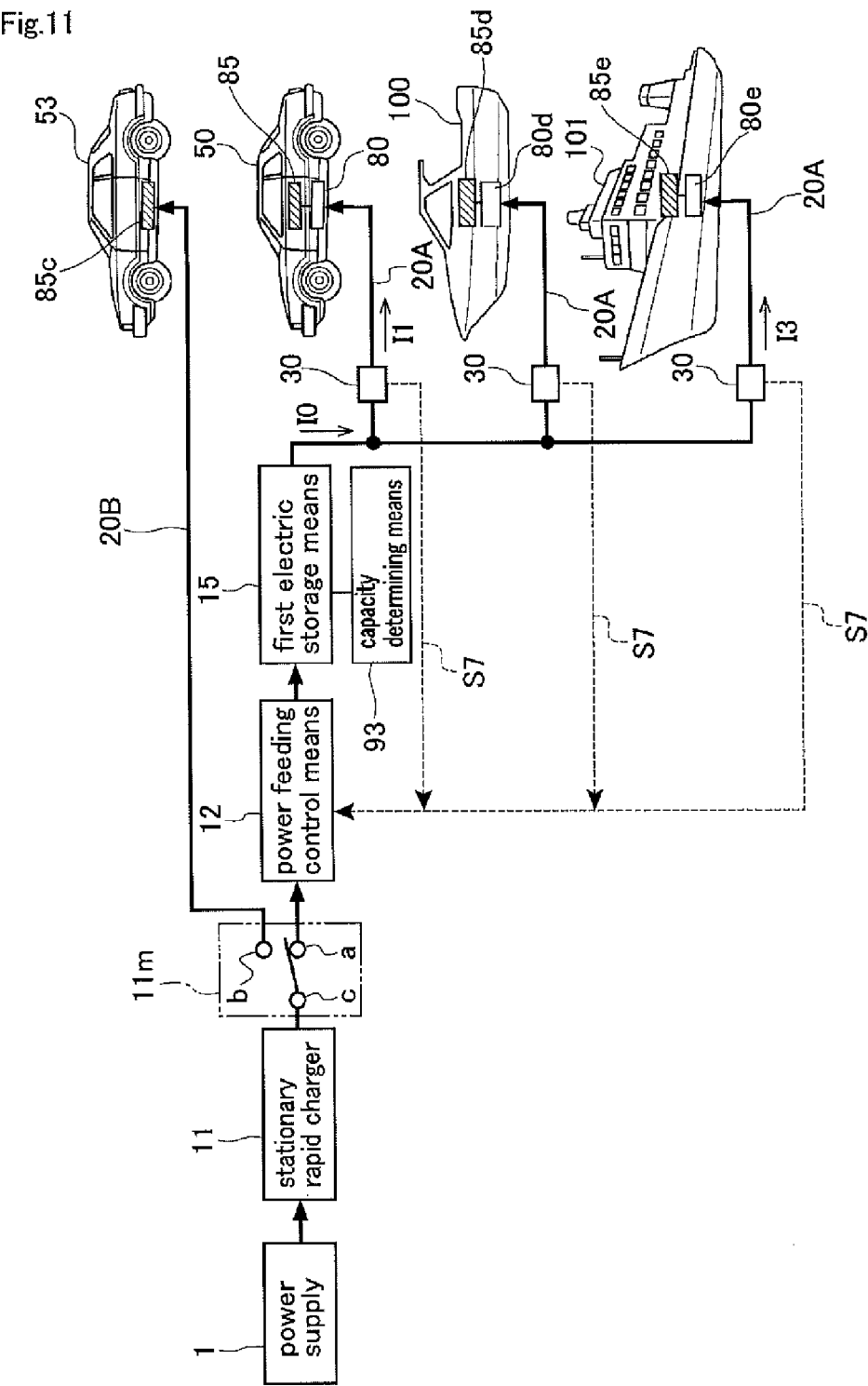
FIG. 11 is a schematic diagram of a rapid charging power supply system according to Embodiment 2 of the present invention.

(Embodiment 2) FIG. 11 shows Embodiment 2 according to the present invention, showing a case of application for rapid charging of both a vehicle and a ship which function as electric moving bodies. The difference in Embodiment 2 from Embodiment 1 is the difference in the type of the electric moving bodies, and the remaining parts correspond to Embodiment 1. Accordingly, the same reference numerals as those in Embodiment 1 are denoted for the corresponding parts, thus omitting the description with respect to the corresponding parts. The same applies to other embodiments to be described below.

As shown in FIG. 11, the respective charging circuits 20A, connected in parallel with the first electric storage means 15, are connected with a vehicle 50, an electric boat 100, and a passenger ship 101. Electric power for rapid charging is suppliable to the second electric storage means 85 of the vehicle 50, to the second electric storage means 85d of the electric boat 100, and to the second electric storage means 85e of the passenger ship 101, from the first electric storage means 15. From the viewpoint of improving the global environment, it is desirable to promote the use of ships that are driven by electric power. As to the motor of ships, it is desirable to apply, for example, a high performance, high-temperature superconducting motor. In the present embodiment, the DC power supplied from the first electric storage means 15 is controlled to have a charging voltage and a charging current optimum for the respective second electric storage means 85d and 85e since charging control is performed for each ship. As a result, simultaneous rapid charging becomes possible for various types of ships. While FIG. 11 shows only the ships that are equipped with the rapid-charging control means 80d or 80e, ships that are not equipped with a rapid-charging control means 80 can be rapidly charged with electric power from the stationary rapid charger 11, as similar to the vehicle 53.

Figure 12:
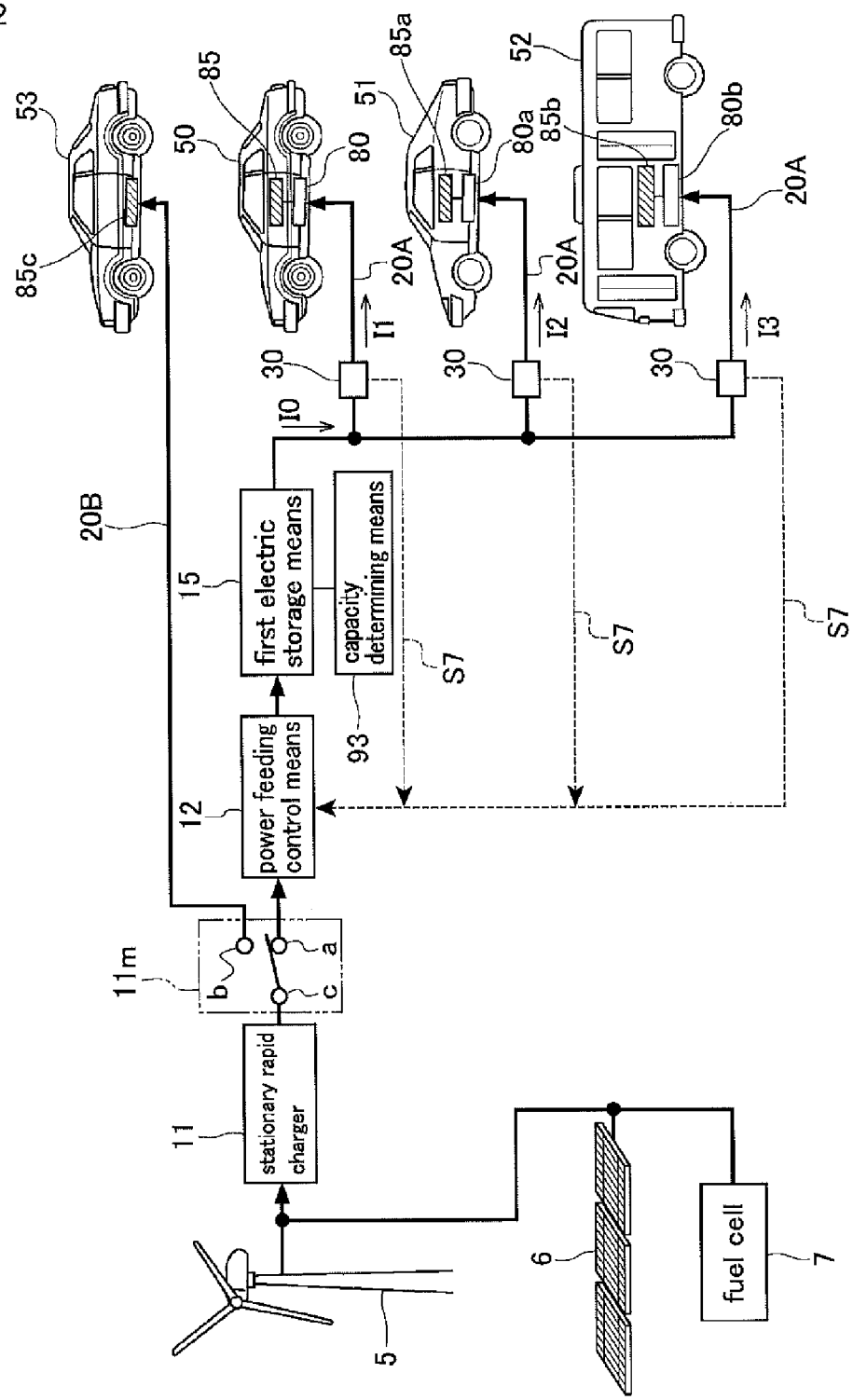
FIG. 12 is a schematic diagram of a rapid charging power supply system according to Embodiment 3 of the present invention.

(Embodiment 3) FIG. 12 shows Embodiment 3 according to the present invention, showing an alternate embodiment of Embodiment 1. A wind power generator 5 or a solar cell 6 is excellent for environment since such generation does not produce $CO_2$ during the generation of electric power. However, such wind power generation and solar power generation are susceptible to weather, and the output is greatly varied, thus having a problem of being difficult to be in cooperation with electric power systems. In Embodiment 3, electric power from a wind power generator 5 or a solar cell 6 with large output variation is stored in a first electric storage means 15 functioning as a stationary electric storage means, and the stored electric power is used to perform rapid charging on vehicle 50. With regard to the first electric storage means 15, it is desirable to select a most suitable type in consideration of the fact that electric power supplied will greatly vary. Furthermore, as shown in FIG. 12, it is also possible for the configuration to use electric power generated by a fuel cell 7, which is operated by hydrogen obtained by reforming fossil fuel.

In Embodiment 3 that is formed as described above, electric power from the wind power generator 5 or the solar cell 6 with great output variation can be stored in the first electric storage means 15, so that rapid charging of various types of vehicles 50, 51 and 52 becomes possible using the stored electric power. There have been plans to store electric power from wind power generation or solar power generation with great output variation into an electric power-storing battery so as to increase the utility value of such wind power generation and solar power generation, and to level electric power load for the cooperation with electric power systems. However, the use of such an electric power-storing battery for leveling increases the cost for generating electric power, resulting in a factor to prevent promotion of utilization of renewable energy. Thus, as in Embodiment 3, electric power from the wind power generator 5 or the solar cell 6 is stored in the first electric storage means 15 to be used for rapid charging of the various types of vehicles 50, 51 and 52, so that a shortcoming of the electric power generation with renewable energy having great output variation can be compensated, thereby promoting the utilization of renewable energy such as solar light or wind power.

Figure 13:
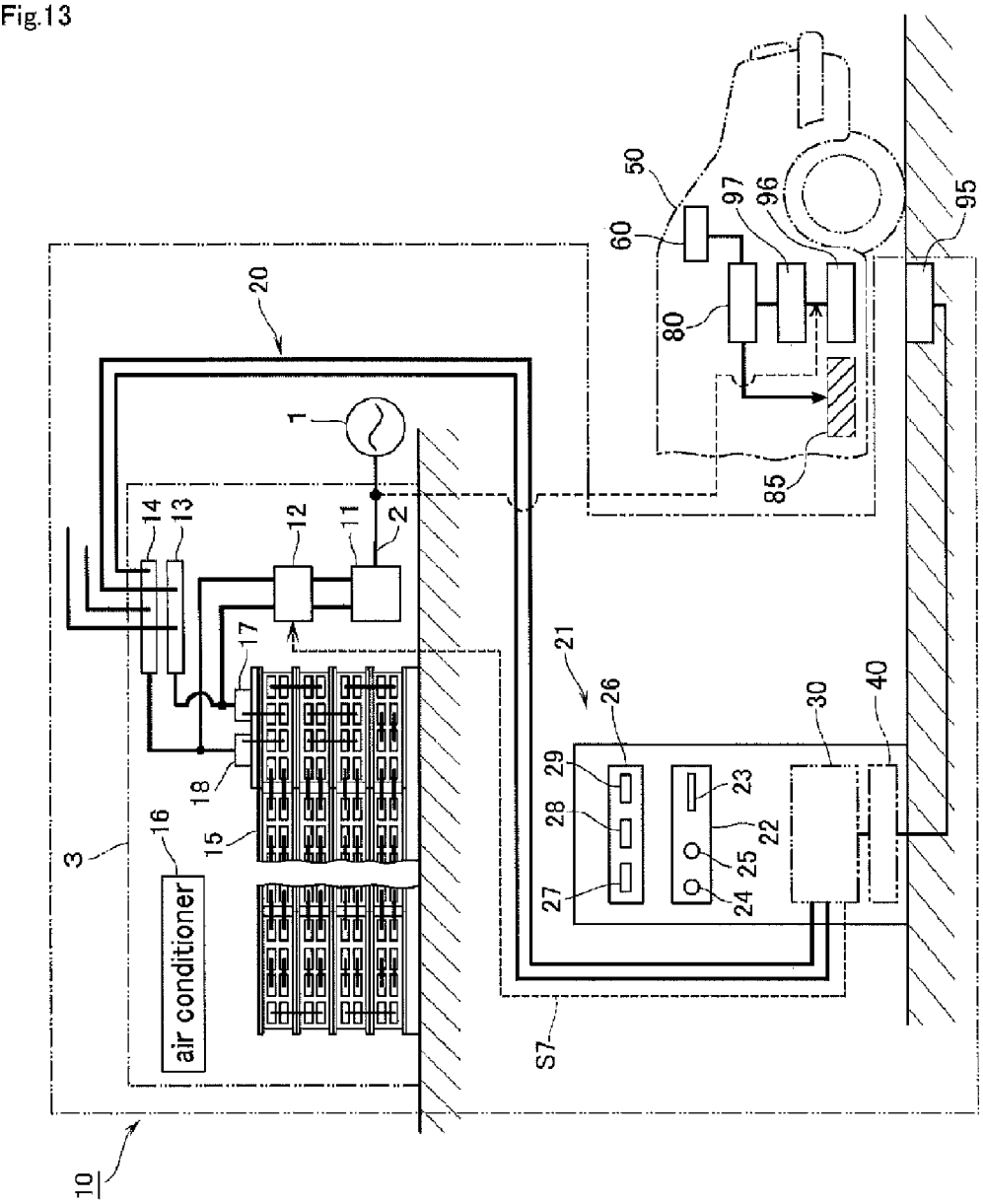
FIG. 13 is a schematic diagram of a rapid charging power supply system according to Embodiment 4 of the present invention.

(Embodiment 4) FIG. 13 shows Embodiment 4 according to the present invention. While a method for feeding electric power by bringing a conducting body of the charging plug 36 into direct contact with a vehicle 50 has been applied in Embodiment 1, a non-contact power feeding method (wireless power feeding method) is applied to facilitate charging operations in Embodiment 4. While the non-contact power feeding method includes electromagnetic induction, electric field coupling (electrostatic induction), resonator coupling (magnetic field resonance, electric field resonance) and the like, a non-contact power feeding method using, for example, electromagnetic induction is applied in Embodiment 3.

As shown in FIG. 13, the opening/closing means 30 is connected with an inverter 40 for converting direct current into alternate current. The inverter 40 has a function of converting DC power from the first electric storage means 15 into an alternate current having high frequency. The output side of the inverter 40 is connected with a primary coil 95, which is buried in the ground. The primary coil 95 is buried in the ground in such a manner that only an upper surface thereof is exposed to the ground surface. The floor section of the vehicle 50 is equipped with a secondary coil 96. During rapid charging, the vehicle 50 stops immediately above the primary coil 95 so that the secondary coil 96 will face the primary coil 95. During rapid charging, high-frequency electric power is supplied from the inverter 40 to the primary coil 95, and AC power is induced by electromagnetic induction in the secondary coil 96. AC power in the secondary coil 96 is converted into DC power by a power converter (converter) 97, and the converted DC power is supplied to the rapid-charging control means 80. It is possible to provide two resonators (not shown in figures) which resonate with each other, interposed between the primary coil 95 and the secondary coil 96, so that the power feeding method by electromagnetic induction can be changed to a power feeding method by magnetic field resonance.

In Embodiment 4 that is formed as described above, the electric power from the first electric storage means 15 is supplied to the rapid-charging control means 80 of the vehicle 50 in a non-contacting state, and rapid charging becomes possible without using a charging plug 36 as in FIG. 5. Accordingly, mechanical coupling will not be necessary in rapid charging, thus the rapid charging operations are significantly facilitated. Since the vehicle 50 in FIG. 13 has the power converter (converter) 97, rapid charging becomes possible by inputting the AC power supplied from the power supply 1 into the power converter 97.

Figure 14:
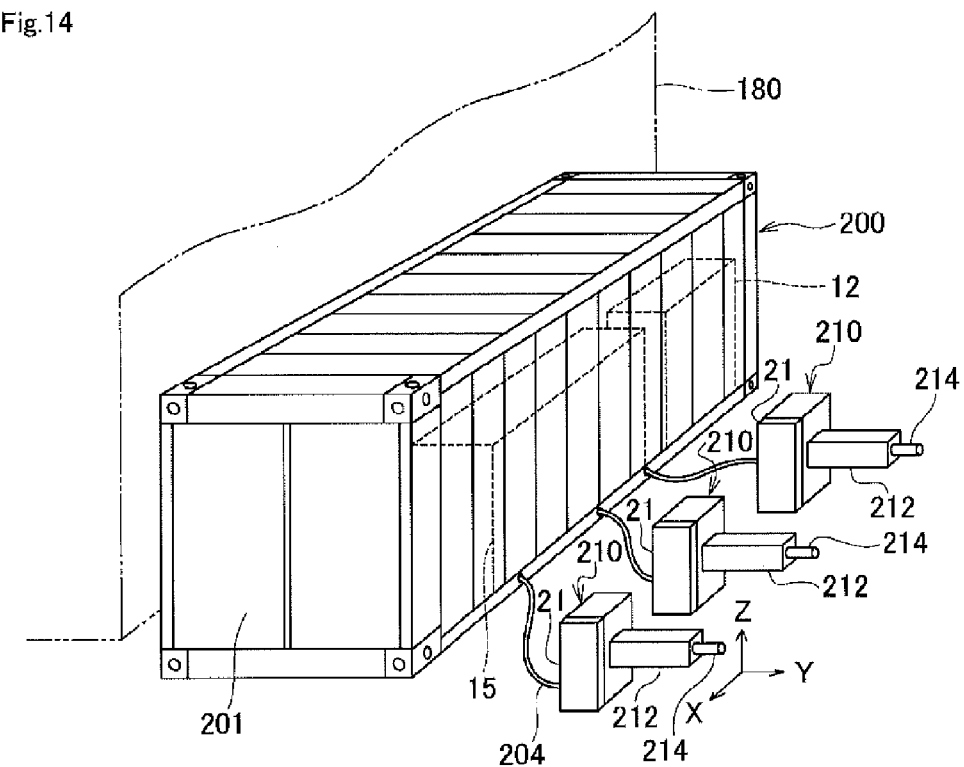
FIG. 14 is a schematic diagram of a rapid charging power supply system according to Embodiment 5 of the present invention.

(Embodiment 5) FIGS. 14 to 17 show Embodiment 5 according to the present invention, showing a case of application to an existing mobile phone base station 180. The existing mobile phone base station 180 is provided with a movable electric power storage facility 200 added thereon. As for the electric power storage facility 200, a marine container, for example, is used. Such a marine container is excellent in handling since the size of the marine container is regulated by the international standards, and the marine container can be easily transported anywhere in the world by ship, which is extremely convenient in terms of distribution. The marine container used as the electric power storage facility 200 is modified to a structure that is particularly suitable for electric power storage. As shown in FIG. 14, within the electric power storage facility 200, there are, housed therein, at least a stationary rapid charger (not shown in figures), a power feeding control means 12, and a first electric storage means 15. Moving of apparatuses into and out of the electric power storage facility 200 can be performed through a door 201. In Embodiment 5, the stationary rapid charger (not shown in figures) for rapidly charging the first electric storage means 15 becomes capable of rapid charging a vehicle of the type that is not equipped with a rapid-charging control means 80, in addition to the vehicle 50, by using a power supply switching means (not shown in figures) similar to the power supply switching means 11m in FIG. 1.

The mobile phone base station 180 is usually operated in an unmanned manner. Accordingly, rapid charging of the vehicle 50 is performed with support by a charging robot 210 in Embodiment 5. In addition, in Embodiment 5, since rapid charging is performed on a plurality of vehicles 50 at the same time, three charging robots 210, for example, are disposed near the electric power storage facility 200. The three charging robots 210 are protected from rain water in the rain by a roof (not shown in figures) provided thereabove.

The charging robot 210 has a robot body 211, a first movable arm 212, a second movable arm 213, and a charging arm 214. A charging terminal 21 is provided on a side surface portion of the robot body 211. The charging terminal 21 is electrically connected with respective apparatuses within the electric power storage facility 200 via a cable 204. The first movable arm 212 is movable in an up and down direction and in a horizontal direction (three dimensional directions of X, Y, Z axes in FIG. 5). The second movable arm 213 is provided at a tip portion of the first movable arm 212, and is swingable with respect to the first movable arm. 212 in the up and down direction with a fulcrum 213a as the center.

A charging plug 30 is connected to the charging arm 214, the charging plug 30 being coupleable with a charging connector 54 of the vehicle 50. A visual sensor 214a is provided at a tip portion of the charging arm 214, for visually recognizing the charging connector 54 of the vehicle 50. The charging robot 210 has a function of controlling the first movable arm 212 and second movable arm 213 based on image information from the visual sensor 214a, to allow the charging plug 36 to couple with the charging connector 54 of the vehicle 50 in an optimum positional relationship. The charging arm. 214 is capable of advancing and retreating in the front-back direction with respect to the second movable arm 213, and has a function of allowing the charging plug 36 to engage with the charging connector 54.

Figure 16:
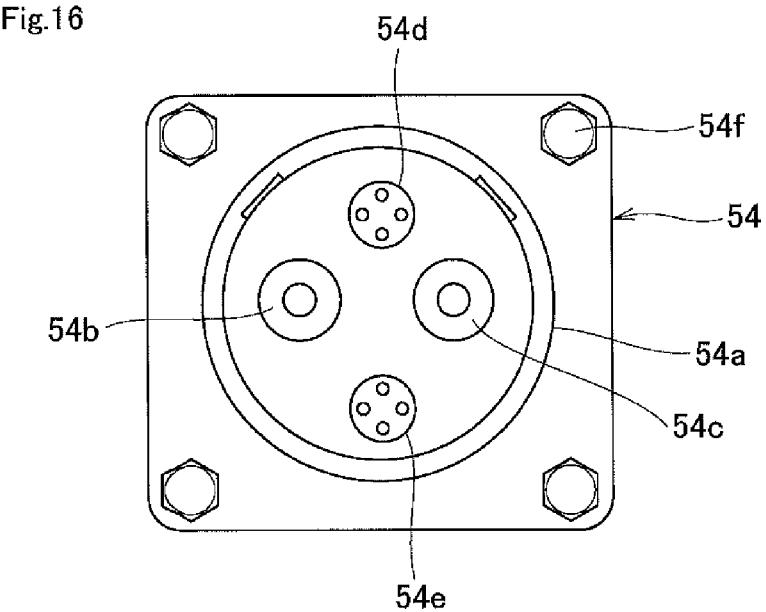
FIG. 16 is an enlarged front view of a charging connector of the vehicle in FIG. 15.

FIG. 16 shows a charging connector 54 of a vehicle 50. The charging connector 54 has a housing 54a, which has electrical insulation, fittable into the charging plug 36. The housing 54a includes a negative electrode 54b and a positive electrode 54c for power feeding, respectively provided in the left and right direction thereof. In addition, communication terminals 54d and 54e are provided in the up and down direction at the internal side of the housing 54a, for allowing communication between the vehicle 50 and the power supplying side. The housing 54a is secured to a vehicle front portion 51 through a bolt 54f.

Figure 17:
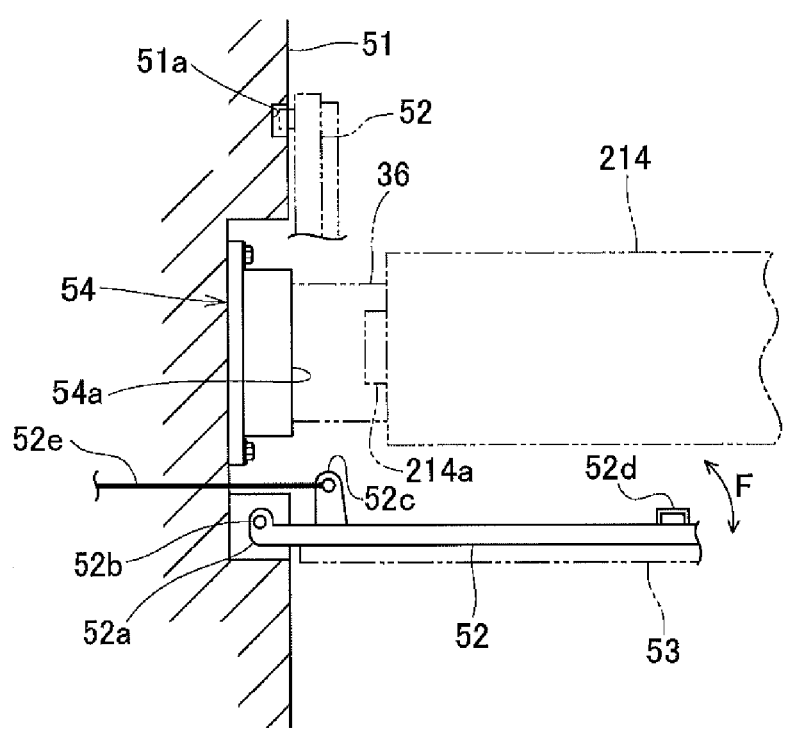
FIG. 17 is a partially enlarged front view showing a connection state of a charging robot in FIG. 15 and a vehicle.

FIG. 17 shows an attachment structure of a charging connector 54 in a vehicle 50. The charging connector 54 is positioned at the vehicle front portion 51 of the vehicle 50, and is normally covered with a protection cover 52. A license plate (automobile registration number certificate) 53 for identifying the vehicle 50 is attached to the outer surface side of the protection cover 52. Specifically, the charging connector 54 is provided at a position facing the license plate 53. The reason why the charging connector 54 is provided at the position facing the license plate 53 of the vehicle front portion 51 is that there is not a significant difference in the height from a ground surface GL to the license plate 53 among most of the vehicles, which facilitates automation of rapid charging by the charging robot 210.

As shown in FIG. 17, the protection cover 52 to which the license plate 53 is attached is supported in a swingable manner in the up and down direction with respect to the vehicle front portion 51. One end portion 52a of the protection cover 52 is pivotable with respect to the vehicle front portion 51 via an axis 52b. On the side proximate to the free end section of the protection cover 52, a lock metal part 52d is provided which is engageable with a lock mechanism section 51a provided at the vehicle front portion 51. In a state where the lock metal part 52d is engaged with the lock mechanism section 51a, the charging connector 54 is covered with the protection cover 52. The protection cover 52 includes an interlocking arm 52c provided therefor. The interlocking arm 52c is connected with a cable wire 52e for opening and closing the protection cover 52 from the driver's seat of the vehicle 50. In Embodiment 2, the cable wire 52e is interlocked with an electric motor (not shown in figures), so that it is possible to perform the opening and closing of the protection cover 52 in an automatic manner.

Next, procedures and functions will be described for a rapid charging operation of a vehicle 50 in Embodiment 5.

Figure 15:
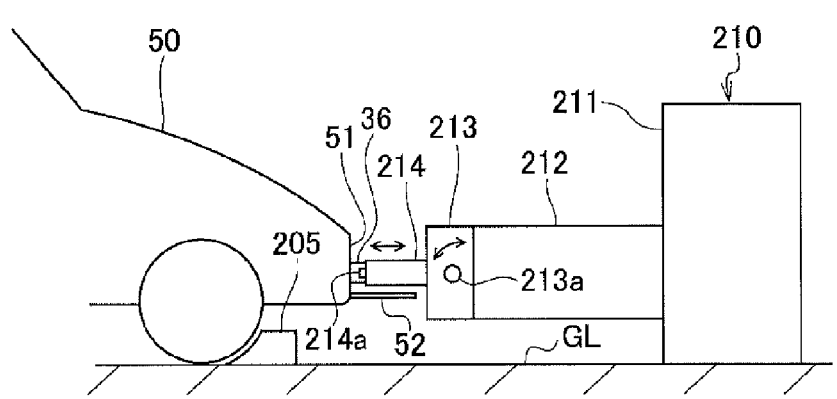
FIG. 15 is a front view showing a connection state of a charging robot in FIG. 14 and a vehicle.

As shown in FIG. 15, in order to perform rapid charging on the vehicle 50, the vehicle 50 is firstly brought closer to the charging robot 210, and the front wheels of the vehicle 50 are allowed to be in contact with a car stop 205 that is provided on the ground surface GL. In this state, the vehicle 50 is brought to a stop, and the parking brake is operated. Thereafter, through an operation from the driver's seat, the protection cover 52 of the vehicle front portion 51 is opened to expose the charging connector 54.

Next, the driver gets off the driver's seat and operates a charging robot operating switch (not shown in figures) of the charging terminal 21 to start the charging robot 210. Since the charging robot 210 has the visual sensor 214a, the charging robot 210 controls the first movable arm 212 and the second movable arm 213 to position the charging plug 36 to be in an optimum positional relationship with the charging connector 54 of the vehicle 50, based on image information from the visual sensor 214a. Next, the charging arm 214 advances towards the vehicle front portion 51 to cause the charging plug 36 to be fit into the charging connector 54. In this state, the charging connector 54 and the charging plug 36 are in an electrically coupled state, and preparation for rapid charging of the vehicle 50 is completed. Thereafter, signals are exchanged between the power supply side and the vehicle 50 side, and when preparation conditions are satisfied, the rapid charging is started for the vehicle 50.

The rapid charging of the vehicle 50 is performed with the electric power stored in the first electric storage means 15, so that a large amount of the electric power can be supplied at once from the first electric storage means 15 to the vehicle 50. Accordingly, the charging will be completed in an extremely short period of time. When the rapid charging to the vehicle 50 is completed, the charging robot 210 retreats the charging arm 214 due to a signal from the vehicle 50, causing the charging plug 36 to be pulled out of the charging connector 54. Thereafter, the first movable arm 212 is retreated, and the first movable arm 212 returns to its initial position.

As such, rapid charging of the vehicle 50 is performed with the support by the charging robot 210, so that the burden on the driver for the rapid charging can be reduced, and the charging operation becomes significantly easier compared to manual rapid charging. In addition, since the license plate of the vehicle front portion is attached to almost the same position throughout the world, one charging robot 210 can handle almost all the types of vehicles, thereby commoditizing the charging robot 210. As a result, the charging robot 210 can be spread worldwide, thereby internationally standardizing the charging robot 210.

Figure 18:
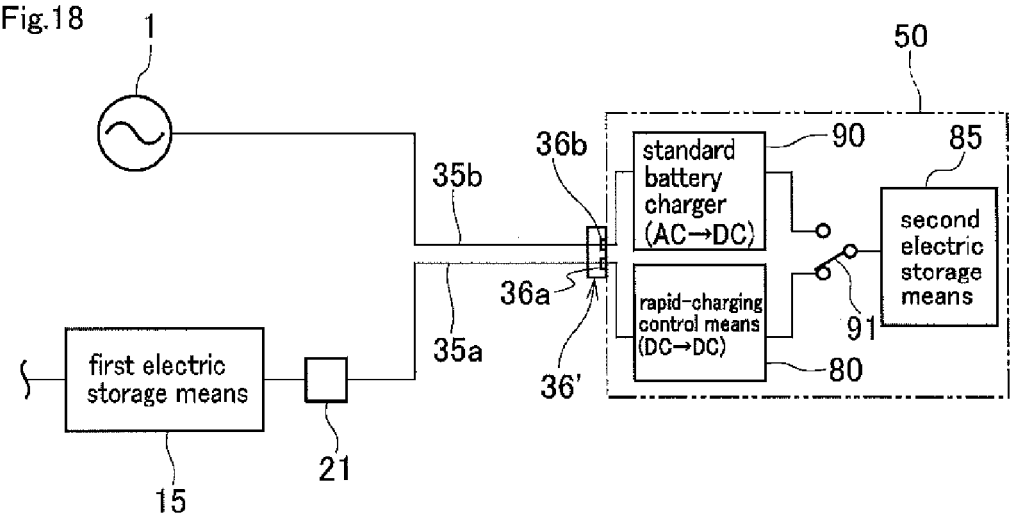
FIG. 18 is a schematic diagram of a rapid charging power supply system according to Embodiment 6 of the present invention.
Figure 19:
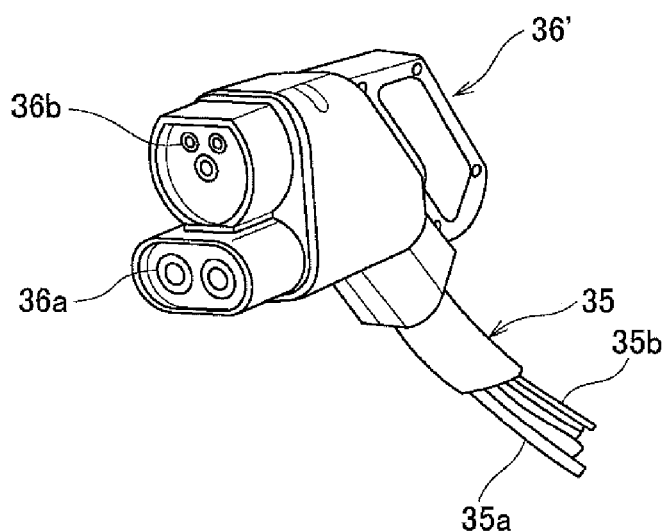
FIG. 19 is a perspective view of a charging plug of the rapid charging power supply system in FIG. 18.

(Embodiment 6) FIGS. 18 and 19 show Embodiment 6 according to the present invention. The vehicle 50 in Embodiment 6 is equipped with a standard battery charger 90, which allows for charging at home or the like, in addition to the rapid-charging control means 80 as shown in FIG. 18. The standard battery charger 90 is for charging the vehicle 50 over a long period of time (several hours to several dozen hours), and has an electric power conversion ability of, for example, about 2 to 3 KW. The standard battery charger 90 has a function of converting AC power of voltage, such as 100V or 200V, supplied from the AC power supply 1 into a voltage and a current of direct current suitable for normal charging of the second electric storage means 85. The vehicle 50 has a charging switch circuit 91 for switching the second electric storage means 85 for either rapid charging or normal charging.

FIG. 19 shows a common charging plug 36', referred to as a "combo method", capable of performing both rapid charging and normal charging with one charging plug. The common charging plug 36' has a rapid charging connection section 36a and a normal charging connection section 36b. The rapid charging connection section 36a is connected with a rapid charging cable 35a, which is capable of allowing a large electric current to flow therethrough. The normal charging connection section 36b is connected with a normal charging cable 35b. The common charging plug 36' is connected with a communication cable (not shown in figures) for transferring signals between the vehicle 50 and the AC power supply 1 side or the first electric storage means 15 side. The charging switch circuit 91 of the vehicle 50 performs a switching operation based on a signal sent from the AC power supply 1 side or the first electric storage means 15 side to the vehicle 50 through the common charging plug 36'.

In Embodiment 6 with such a configuration, when rapid charging is performed on the vehicle 50, the common charging plug 36' is attached to the vehicle 50, and then operations for starting the charging are performed at the charging terminal 21. As a result, the charging switch circuit 91 is switched to the side for the rapid-charging control means 80, and rapid charging is performed on the second electric storage means 85 with DC power controlled by the rapid-charging control means 80. In addition, when normal charging is performed on the vehicle 50, the common charging plug 36' is attached to the same part as that for performing rapid charging on the vehicle 50. As a result, the charging switch circuit 91 is switched to the side for the standard battery charger 90 by the signal sent from a control apparatus (not shown in figures) provided on the side proximate to the AC power supply 1, and normal charging is performed on the second electric storage means 85 with DC power controlled by the standard battery charger 90. As such, one common charging plug 36' allows for both rapid charging and normal charging, and thus the handling becomes easier during the charging and the charging apparatus can be simpler compared to a case where two charging plugs are comprised for rapid charging and normal charging.

Figure 20:
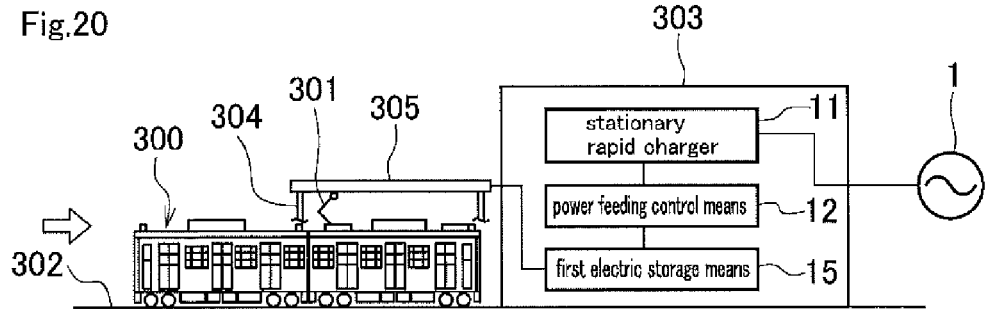
FIG. 20 is a schematic diagram of the rapid charging power supply system according to Embodiment 7 of the present invention.
Figure 21:
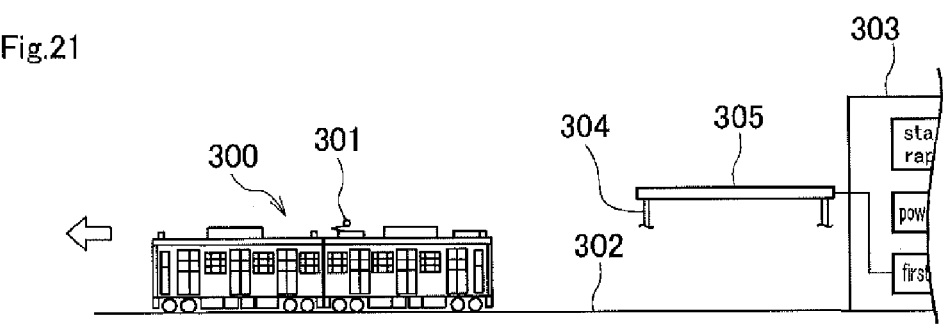
FIG. 21 is a side view showing a state when an operation is started after completion of rapid charging of an electric railcar in FIG. 20.
Figure 22:
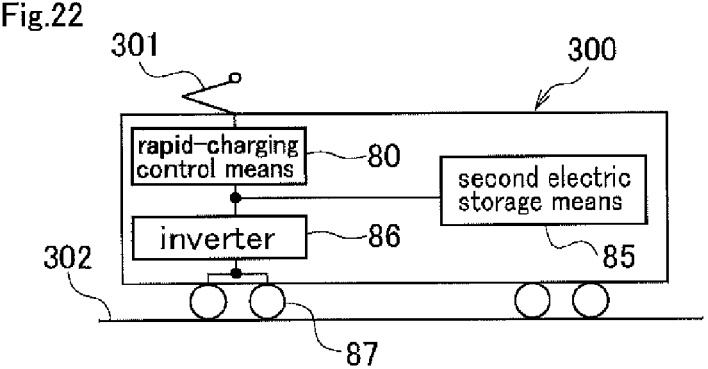
FIG. 22 is a schematic diagram of a charging control circuit of the electric railcar in FIG. 10.

(Embodiment 7) FIGS. 20 to 22 show Embodiment 7 according to the present invention. Embodiment 7 shows a case of application for rapid charging of an electric railcar 300 equipped with a storage battery. As shown in FIG. 22, the electric railcar 300 has a rapid-charging control means 80, a second electric storage means 85, an inverter 86, and a running motor 87. As shown in FIG. 20, an elevatable charging pantograph 301 is provided on the side proximate to the roof of the electric railcar 300, which runs on a travelling rail 302. A charging building 303 includes, disposed therein, a stationary rapid charger 11, a power feeding control means 12, and a first electric storage means 15. At a position adjacent to the charging building 303, a charging conductor 305 is provided through an insulation support 304 fixed on the side proximate to the ground. The charging conductor 305 is formed of a belt-shaped copper alloy extending in the horizontal direction. The charging conductor 305 is electrically connected with a first electric storage means 15 through a charging circuit 20A. The charging pantograph 301 of the electric railcar 300 is configured to contact with the charging conductor 305 when being elevated. The stationary rapid charger 11 becomes capable of performing rapid charging on vehicles of the type that are not equipped with the rapid-charging control means 80, in addition to the electric railcar 300, by using a power supply switching means (not shown) similar to the power supply switching means 11m in FIG. 1.

In Embodiment 7 with such a configuration, when the remaining capacity of the second electric storage means 85 is decreased by running, the electric railcar 300 runs towards the charging building 303 on the travelling rail 302 and stops in front of the charging building 303. When the electric railcar 300 stops at a predetermined position, the driver causes the charging pantograph 301 to rise through a remote operation, to allow the charging pantograph 301 to contact with the charging conductor 305. As a result, DC power stored in the first electric storage means 15 is supplied through the charging conductor 305 to the electric railcar 300. The DC power supplied to the electric railcar 300 is controlled to have a charging voltage and a charging current optimum for rapid charging of the second electric storage means 85 by the rapid-charging control means 80, and rapid charging is performed on the second electric storage means 85 equipped in the electric railcar 300. When the rapid charging of the second electric storage means 85 is completed, the charging pantograph 301 is lowered, and power supply is stopped from the first electric storage means 15 to the electric railcar 300. In addition, the electric railcar 300 runs in a direction away from the charging building 303 as shown in FIG. 21, and re-starts its operation.

Hereinbefore, Embodiments 1 to 7 according to the present invention have been described in detail. The specific configurations are not limited to these embodiments, and even if changes in design or the like are made that do not depart from the gist of the present invention, such changes or the like are included in the present invention. The electric moving bodies as the subject of rapid charging are so-called traffic machines, including vehicles, ships, and aircrafts. Such electric moving bodies are not limited to those that travel a long distance, but include construction machines and robots with a short moving range, and industrial machines such as forklifts and the like. In addition, the fossil fuel used for the fuel cell 7 shown in FIG. 12 can be either liquid or gas. Furthermore, the electric power which is generated with renewable energy (natural energy) and which is supplied to the stationary rapid charger 11 is not limited to being from wind power generation or solar power generation, but it is a matter of course to include biomass power generation, ocean energy such as wave power and ocean current, and the like.

The rapid charging power supply system 10 may be provided next to an existing gas station, or may be the configuration provided for a mobile phone base station having a large-capacity storage battery for back-up provided for the occurrence of electric power failure. In addition, the rapid charging power supply system 10 is also capable of performing rapid charging on a vehicle and a ship respectively at the same location as shown in FIG. 11. Thus, when applied to a fishing port or the like, a single stationary rapid charger 11 can be used to perform rapid charging on an electric vehicle for transporting fish and shellfish and an electric-motored fishing boat. Further, the present invention is applicable for rapid charging of plug-in hybrid vehicles (PHV), each of which is equipped with an engine and a motor and is capable of running only with the engine or motor, in addition to pure electric vehicles which run only with a motor.

REFERENCE SIGNS LIST 1 commercial AC power supply (power supply)
5 wind power generator (power supply)
6 solar cell (power supply)
7 fuel cell (power supply)
10 rapid charging power supply system
11 stationary rapid charger
11*m* power supply switching means
12 power feeding control means
15 first electric storage means (stationary electric storage means)
20A first charging circuit
20B second charging circuit
21 charging terminal
23 operation section
26 display section
30 opening/closing means
31 switch
32 switch control section
36 charging plug
50 vehicle (first electric moving body)
53 vehicle (second electric moving body)
60 cooling unit
61 thermoelectric cooling device
65 charging connector
80 rapid-charging control means
81 power control section
82 charging control unit
83 temperature control unit
84 charging information processing section
85 second electric storage means (on-vehicle electric storage means of the first electric moving body)
85*c* second electric storage means (on-vehicle electric storage means of the second electric moving body)
93 capacity determining means
100 ship (second electric moving body)
120 power supply switch
121 inverter

The invention claimed is:

1. A rapid charging power supply system capable of supplying electric power for rapid charging to each of a first electric moving body equipped with a rapid-charging control means, and a second electric moving body which is not equipped with the rapid-charging control means, wherein the rapid charging power supply system comprises:
   a stationary rapid charger for controlling electric power supplied from a power source to be DC power having a voltage and a current optimized for rapid charging of an on-vehicle electric storage means equipped in the second electric moving body;
   a power supply switching means for supplying the DC power from the stationary rapid charger through switching of either a first charging circuit for supplying the DC power to the first electric moving body or a second charging circuit for supplying the DC power to the second electric moving body;
   a stationary electric storage means connectable with the stationary rapid charger side through the power supply switching means, the stationary electric storage means being charged with the DC power supplied from the stationary rapid charger to the first charging circuit side through the power supply switching means, and being capable of at least storing the DC power to be directly sent to the first electric moving body, except for during the charging of the on-vehicle electric storage means of the second electric moving body; and
   a power feeding control means provided between the power supply switching means and the stationary electric storage means, for discontinuing power feeding from the stationary rapid charger to the stationary electric storage means during charging of an on-vehicle electric storage means of the first electric moving body with the DC power output from the stationary electric storage means.

2. The rapid charging power supply system according to claim 1, wherein a part of the electric power stored in the stationary electric storage means is usable for rapid charging of the on-vehicle electric storage means of the second electric moving body through the stationary rapid charger.

3. The rapid charging power supply system according to claim 1, wherein the stationary electric storage means is connected with an inverter for converting DC power to AC power and supplying the converted AC power to a commercial electric power system.

4. The rapid charging power supply system according to claim 1, wherein the stationary rapid charger is capable of supplying DC power in which neither a voltage nor a current is controlled for rapid charging, to the first electric moving body connected to the first charging circuit.

5. The rapid charging power supply system according to claim 1, wherein the first electric moving body has a power converter for converting AC power from a commercial AC power supply or a non-contact power feeding means connected to the stationary electric storage means side into DC power, and the rapid-charging control means is connected with an output side of the power converter.

6. The rapid charging power supply system according to claim 1, wherein the electric power input to the stationary rapid charger is electric power generated by utilizing renewable energy.

* * * * *